US012677273B2

(12) United States Patent
Yuan et al.

(10) Patent No.: US 12,677,273 B2
(45) Date of Patent: Jul. 7, 2026

(54) DYNAMIC UPLINK CONTROL MULTIPLEXING BETWEEN PHYSICAL UPLINK CHANNELS

(71) Applicant: QUALCOMM Incorporated, San Diego, CA (US)

(72) Inventors: Fang Yuan, Beijing (CN); Wooseok Nam, San Diego, CA (US); Chao Wei, Beijing (CN); Tao Luo, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 745 days.

(21) Appl. No.: 18/001,584

(22) PCT Filed: Jun. 26, 2020

(86) PCT No.: PCT/CN2020/098305
§ 371 (c)(1),
(2) Date: Dec. 12, 2022

(87) PCT Pub. No.: WO2021/258385
PCT Pub. Date: Dec. 30, 2021

(65) Prior Publication Data
US 2023/0232394 A1 Jul. 20, 2023

(51) Int. Cl.
*H04W 72/1268* (2023.01)
*H04L 1/1812* (2023.01)
(Continued)

(52) U.S. Cl.
CPC ....... *H04W 72/1268* (2013.01); *H04L 1/1812* (2013.01); *H04W 72/21* (2023.01); *H04W 72/51* (2023.01)

(58) Field of Classification Search
CPC ... H04L 1/1812; H04L 5/0044; H04L 5/0053; H04W 72/1268; H04W 72/20; H04W 72/21; H04W 72/51
See application file for complete search history.

(56) References Cited

U.S. PATENT DOCUMENTS 11,412,490 B2 * 8/2022 Wang .................... H04L 1/1819
2019/0246432 A1 8/2019 Hosseini et al.
(Continued)

FOREIGN PATENT DOCUMENTS

CN       110661607 A    1/2020
CN       110972286 A    4/2020

OTHER PUBLICATIONS

International Search Report and Written Opinion—PCT/CN2020/098305—ISA/EPO—Mar. 17, 2021.

*Primary Examiner* — Awet Haile
(74) *Attorney, Agent, or Firm* — Holland & Hart LLP/Qualcomm Incorporated

(57) ABSTRACT

Methods, systems, and devices for wireless communications are described. In some wireless communications systems, a user equipment (UE) may support simultaneous transmissions of data on an uplink shared channel that is associated with a first cell, and control information such as uplink control information on an uplink control channel associated with a second cell. The UE may receive scheduling information that indicates a time domain overlap of scheduled transmissions associated with the uplink control channel and the uplink shared channel, and a multiplexing configuration for the UE which indicates whether the UE is to multiplex the uplink control information on the uplink control channel or whether the UE is to multiplex the uplink control information on the uplink shared channel.

30 Claims, 18 Drawing Sheets

(51) Int. Cl.
    *H04W 72/21*        (2023.01)
    *H04W 72/51*        (2023.01)

(56)           References Cited

U.S. PATENT DOCUMENTS

| | | | |
|---|---|---|---|
| 2019/0313342 A1* | 10/2019 | Papasakellariou .. | H04W 52/325 |
| 2020/0008194 A1 | 1/2020 | Huang et al. | |
| 2022/0158775 A1* | 5/2022 | Xiong ................... | H04L 1/1864 |
| 2022/0279570 A1* | 9/2022 | Li ........................ | H04L 1/1812 |
| 2023/0105294 A1* | 4/2023 | Park .................... | H04W 72/569 |
| | | | 370/329 |
| 2023/0123957 A1* | 4/2023 | Jung .................... | H04L 5/0094 |
| | | | 370/329 |

* cited by examiner

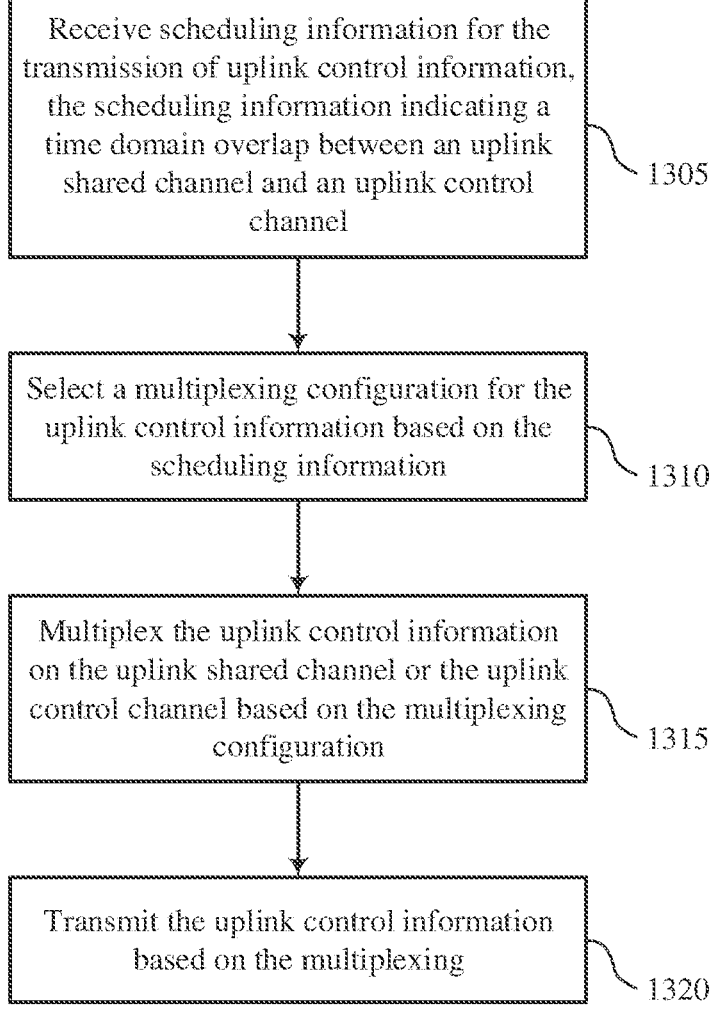

Receive scheduling information for the transmission of uplink control information, the scheduling information indicating a time domain overlap between an uplink shared channel and an uplink control channel

1305

Select a multiplexing configuration for the uplink control information based on the scheduling information

1310

Multiplex the uplink control information on the uplink shared channel or the uplink control channel based on the multiplexing configuration

1315

Transmit the uplink control information based on the multiplexing

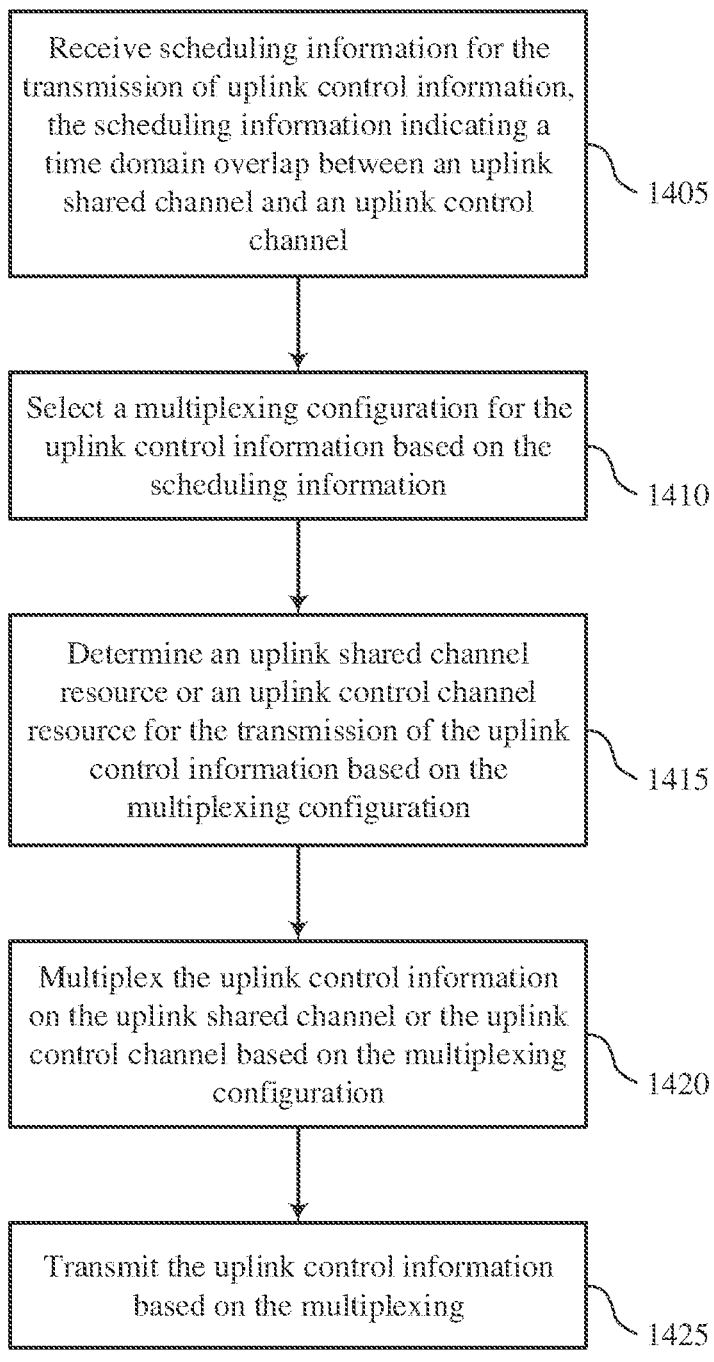

Receive scheduling information for the transmission of uplink control information, the scheduling information indicating a time domain overlap between an uplink shared channel and an uplink control channel

1405

Select a multiplexing configuration for the uplink control information based on the scheduling information

1410

Determine an uplink shared channel resource or an uplink control channel resource for the transmission of the uplink control information based on the multiplexing configuration

1415

Multiplex the uplink control information on the uplink shared channel or the uplink control channel based on the multiplexing configuration

1420

Transmit the uplink control information based on the multiplexing

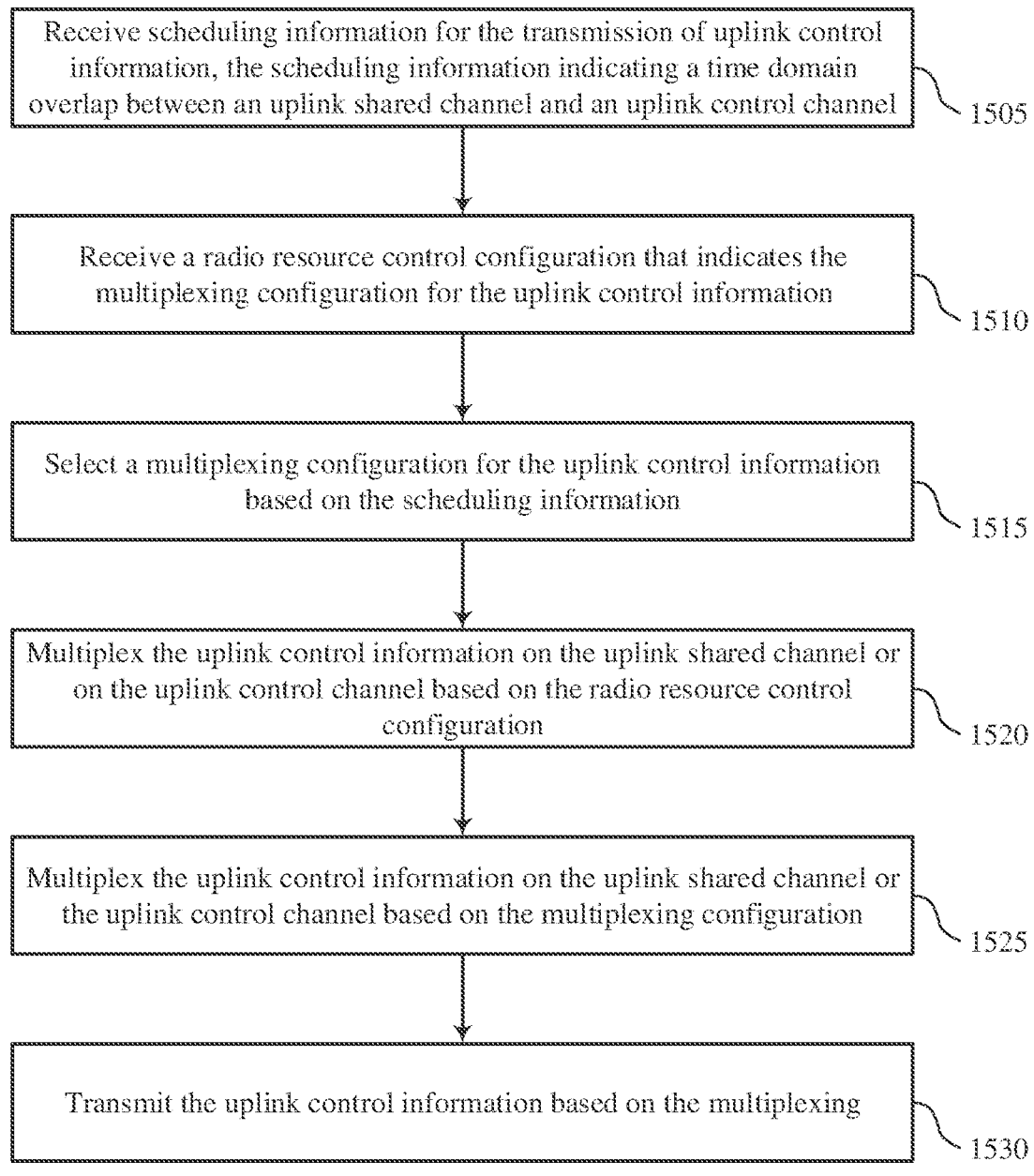

Receive scheduling information for the transmission of uplink control information, the scheduling information indicating a time domain overlap between an uplink shared channel and an uplink control channel

1505

Receive a radio resource control configuration that indicates the multiplexing configuration for the uplink control information

1510

Select a multiplexing configuration for the uplink control information based on the scheduling information

1515

Multiplex the uplink control information on the uplink shared channel or on the uplink control channel based on the radio resource control configuration

1520

Multiplex the uplink control information on the uplink shared channel or the uplink control channel based on the multiplexing configuration

1525

Transmit the uplink control information based on the multiplexing

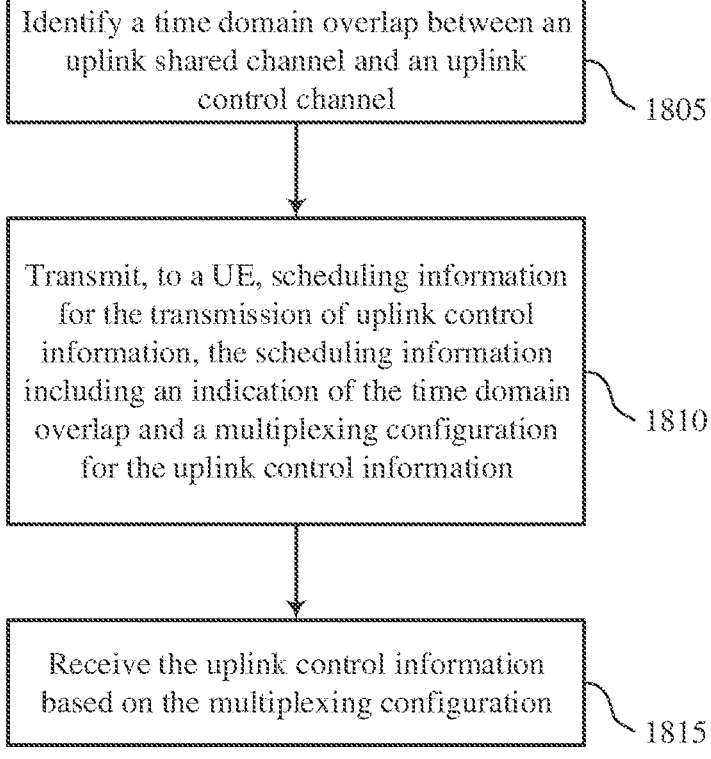

Identify a time domain overlap between an
uplink shared channel and an uplink
control channel
1805

Transmit, to a UE, scheduling information
for the transmission of uplink control
information, the scheduling information
including an indication of the time domain
overlap and a multiplexing configuration
for the uplink control information
1810

Receive the uplink control information
based on the multiplexing configuration
1815

DYNAMIC UPLINK CONTROL MULTIPLEXING BETWEEN PHYSICAL UPLINK CHANNELS

CROSS REFERENCE

The present Application is a 371 national stage filing of International PCT Application No. PCT/CN2020/098305 by Yuan et al. entitled "DYNAMIC UPLINK CONTROL MULTIPLEXING BETWEEN PHYSICAL UPLINK CHANNELS," filed Jun. 26, 2020, which is assigned to the assignee hereof, and which is expressly incorporated by reference in its entirety herein.

FIELD OF TECHNOLOGY

The following relates generally to wireless communications and more specifically to dynamic uplink control multiplexing between physical uplink channels.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support dynamic uplink control multiplexing between physical uplink channels. Generally, the described techniques provide for a user equipment (UE) to select a configuration for multiplexing uplink control information (UCI) on one or more uplink channels. In some wireless communications systems, the UE may support simultaneous transmissions (e.g., transmissions that at least partially overlap in time) of data on a physical uplink shared channel (PUSCH) that is associated with a first cell, and control information such as uplink control information (UCI) on a physical uplink control channel (PUCCH) associated with a second cell which can be the same cell or a different cell as the first cell. In cases where transmissions on the PUSCH and the PUCCH overlap in time, the UE may determine to multiplex the UCI with the PUCCH or the PUSCH based on a multiplexing configuration received from a base station. For example, the UE may receive scheduling information that indicates the time domain overlap of the PUCCH and the PUSCH, and may include the multiplexing configuration. The UE may determine whether to multiplex the UCI on the PUCCH and separately transmit or drop the PUSCH or whether to multiplex the UCI on the PUSCH. The UE may simultaneously transmit the PUSCH and the PUCCH in cases where the UCI is multiplexed with the PUCCH. In cases where the UCI is multiplexed or "piggybacked" on the PUSCH, the UE may refrain from transmitting the PUCCH.

A method of wireless communications at a UE is described. The method may include receiving scheduling information for the transmission of uplink control information, the scheduling information indicating a time domain overlap between an uplink shared channel and an uplink control channel, selecting a multiplexing configuration for the uplink control information based on the scheduling information, multiplexing the uplink control information on the uplink shared channel or the uplink control channel based on the multiplexing configuration, and transmitting the uplink control information based on the multiplexing.

An apparatus for wireless communications at a UE is described. The apparatus may include a processor, memory coupled with the processor, and instructions stored in the memory. The instructions may be executable by the processor to cause the apparatus to receive scheduling information for the transmission of uplink control information, the scheduling information indicating a time domain overlap between an uplink shared channel and an uplink control channel, select a multiplexing configuration for the uplink control information based on the scheduling information, multiplex the uplink control information on the uplink shared channel or the uplink control channel based on the multiplexing configuration, and transmit the uplink control information based on the multiplexing.

Another apparatus for wireless communications at a UE is described. The apparatus may include means for receiving scheduling information for the transmission of uplink control information, the scheduling information indicating a time domain overlap between an uplink shared channel and an uplink control channel, selecting a multiplexing configuration for the uplink control information based on the scheduling information, multiplexing the uplink control information on the uplink shared channel or the uplink control channel based on the multiplexing configuration, and transmitting the uplink control information based on the multiplexing.

A non-transitory computer-readable medium storing code for wireless communications at a UE is described. The code may include instructions executable by a processor to receive scheduling information for the transmission of uplink control information, the scheduling information indicating a time domain overlap between an uplink shared channel and an uplink control channel, select a multiplexing configuration for the uplink control information based on the scheduling information, multiplex the uplink control information on the uplink shared channel or the uplink control channel based on the multiplexing configuration, and transmit the uplink control information based on the multiplexing.

Some examples of the method, apparatuses, and non-transitory computer-readable medium described herein may further include operations, features, means, or instructions for determining an uplink shared channel resource or an uplink control channel resource for the transmission of the uplink control information based on the multiplexing configuration.

Some examples of the method, apparatuses, and non-transitory computer-readable medium described herein may further include operations, features, means, or instructions for receiving an indication of a capability of the UE to support the uplink shared channel transmission on a first cell that at least partially overlaps in time with the uplink control channel transmission on a second cell, and selecting the multiplexing configuration based on the capability.

Some examples of the method, apparatuses, and non-transitory computer-readable medium described herein may further include operations, features, means, or instructions for receiving a radio resource control configuration that indicates the multiplexing configuration for the uplink control information, and multiplexing the uplink control information on the uplink shared channel or on the uplink control channel based on the radio resource control configuration.

Some examples of the method, apparatuses, and non-transitory computer-readable medium described herein may further include operations, features, means, or instructions for identifying a radio resource control selection indicator in the radio resource control configuration, and selecting the uplink shared channel or the uplink control channel for multiplexing the uplink control information based on a value of the radio resource control selection indicator.

Some examples of the method, apparatuses, and non-transitory computer-readable medium described herein may further include operations, features, means, or instructions for determining that the multiplexing configuration may be absent from the radio resource control configuration, and multiplexing the uplink control information on the uplink shared channel based on determining that the multiplexing configuration may be absent from the radio resource control configuration.

Some examples of the method, apparatuses, and non-transitory computer-readable medium described herein may further include operations, features, means, or instructions for determining that the radio resource control configuration indicates the uplink shared channel or the uplink control channel for multiplexing the uplink control information, and generating hybrid automatic repeat request information based on the multiplexing configuration.

Some examples of the method, apparatuses, and non-transitory computer-readable medium described herein may further include operations, features, means, or instructions for determining a type of the uplink control information, and multiplexing the uplink control information on the uplink shared channel or on the uplink control channel based on the type of the uplink control information.

Some examples of the method, apparatuses, and non-transitory computer-readable medium described herein may further include operations, features, means, or instructions for identifying the type of the uplink control information as one or more channel state information types, and selecting the multiplexing configuration for the uplink control information based on the one or more channel state information types.

In some examples of the method, apparatuses, and non-transitory computer-readable medium described herein, the one or more channel state information types include periodic channel state information, aperiodic channel state information, semi-persistent channel state information, or a combination thereof.

Some examples of the method, apparatuses, and non-transitory computer-readable medium described herein may further include operations, features, means, or instructions for receiving, a downlink control information message from the base station, and selecting the multiplexing configuration for the uplink control information based on a field of the downlink control information message.

In some examples of the method, apparatuses, and non-transitory computer-readable medium described herein, the field of the downlink control information message indicates an uplink shared channel resource or an uplink control channel resource for transmission of the uplink control information.

Some examples of the method, apparatuses, and non-transitory computer-readable medium described herein may further include operations, features, means, or instructions for determining that the field of the downlink control information message includes a total downlink assignment index field, selecting the multiplexing configuration for the uplink control information based on a value of the total downlink assignment index field, and generating hybrid automatic repeat request information based on the multiplexing configuration.

In some examples of the method, apparatuses, and non-transitory computer-readable medium described herein, the value of the total downlink assignment index field indicates an uplink shared channel resource or an uplink control channel resource for transmission of the uplink control information.

In some examples of the method, apparatuses, and non-transitory computer-readable medium described herein, generating the hybrid automatic repeat request information further may include operations, features, means, or instructions for determining a semi-static configuration or a dynamic configuration for generating the hybrid automatic repeat request information, where the semi-static configuration or the dynamic configuration may be associated with a downlink shared channel codebook.

Some examples of the method, apparatuses, and non-transitory computer-readable medium described herein may further include operations, features, means, or instructions for determining that the uplink control channel transmission includes one or more channel state information reports for the uplink shared channel, and selecting the uplink shared channel or the uplink control channel for transmission of the one or more channel state information reports based on the multiplexing configuration.

Some examples of the method, apparatuses, and non-transitory computer-readable medium described herein may further include operations, features, means, or instructions for determining that the multiplexing configuration includes a radio resource control configuration that indicates whether uplink control information may be to be multiplexed on the uplink shared channel or the uplink control channel, and selecting the uplink shared channel or the uplink control channel for transmission of the one or more channel state information reports.

A method of wireless communications at a base station is described. The method may include identifying a time domain overlap between an uplink shared channel and an uplink control channel, transmitting, to a UE, scheduling information for the transmission of uplink control information, the scheduling information including an indication of the time domain overlap and a multiplexing configuration for the uplink control information, and receiving the uplink control information based on the multiplexing configuration.

An apparatus for wireless communications at a base station is described. The apparatus may include a processor, memory coupled with the processor, and instructions stored in the memory. The instructions may be executable by the processor to cause the apparatus to identify a time domain overlap between an uplink shared channel and an uplink control channel, transmit, to a UE, scheduling information for the transmission of uplink control information, the scheduling information including an indication of the time domain overlap and a multiplexing configuration for the uplink control information, and receive the uplink control information based on the multiplexing configuration.

Another apparatus for wireless communications at a base station is described. The apparatus may include means for identifying a time domain overlap between an uplink shared channel and an uplink control channel, transmitting, to a UE, scheduling information for the transmission of uplink control information, the scheduling information including an indication of the time domain overlap and a multiplexing configuration for the uplink control information, and receiving the uplink control information based on the multiplexing configuration.

A non-transitory computer-readable medium storing code for wireless communications at a base station is described. The code may include instructions executable by a processor to identify a time domain overlap between an uplink shared channel and an uplink control channel, transmit, to a UE, scheduling information for the transmission of uplink control information, the scheduling information including an indication of the time domain overlap and a multiplexing configuration for the uplink control information, and receive the uplink control information based on the multiplexing configuration.

Some examples of the method, apparatuses, and non-transitory computer-readable medium described herein may further include operations, features, means, or instructions for scheduling an uplink shared channel resource or an uplink control channel resource for the transmission of the uplink control information based on the multiplexing configuration.

Some examples of the method, apparatuses, and non-transitory computer-readable medium described herein may further include operations, features, means, or instructions for transmitting an indication of a capability of the UE to support the uplink shared channel transmission on a first cell that at least partially overlaps in time with the uplink control channel transmission on a second cell, and transmitting the scheduling information based on the capability.

Some examples of the method, apparatuses, and non-transitory computer-readable medium described herein may further include operations, features, means, or instructions for transmitting a radio resource control configuration that indicates the multiplexing configuration for the uplink control information, and receiving the uplink control information on the uplink shared channel or on the uplink control channel based on the multiplexing configuration.

Some examples of the method, apparatuses, and non-transitory computer-readable medium described herein may further include operations, features, means, or instructions for transmitting a radio resource control selection indicator in the radio resource control configuration, and receiving the uplink control information multiplexed on the uplink shared channel or the uplink control channel based on a value of the radio resource control selection indicator.

Some examples of the method, apparatuses, and non-transitory computer-readable medium described herein may further include operations, features, means, or instructions for transmitting the radio resource control configuration, and receiving the uplink control information on the uplink shared channel based on the multiplexing configuration being absent from the radio resource control configuration.

Some examples of the method, apparatuses, and non-transitory computer-readable medium described herein may further include operations, features, means, or instructions for receiving, from the UE, hybrid automatic repeat request information based on the radio resource control configuration and the multiplexing configuration.

Some examples of the method, apparatuses, and non-transitory computer-readable medium described herein may further include operations, features, means, or instructions for determining a type of the uplink control information, and receiving the uplink control information multiplexed on the uplink shared channel or on the uplink control channel based on the type of the uplink control information.

Some examples of the method, apparatuses, and non-transitory computer-readable medium described herein may further include operations, features, means, or instructions for identifying the type of the uplink control information as one or more channel state information types, and selecting the multiplexing configuration for the uplink control information based on the one or more channel state information types.

In some examples of the method, apparatuses, and non-transitory computer-readable medium described herein, the one or more channel state information types include periodic channel state information, aperiodic channel state information, semi-persistent channel state information, or a combination thereof.

Some examples of the method, apparatuses, and non-transitory computer-readable medium described herein may further include operations, features, means, or instructions for transmitting a downlink control information message to the UE, where a field of the downlink control information indicates the multiplexing configuration for the uplink control information.

In some examples of the method, apparatuses, and non-transitory computer-readable medium described herein, the field of the downlink control information message indicates an uplink shared channel resource or an uplink control channel resource for transmission of the uplink control information.

Some examples of the method, apparatuses, and non-transitory computer-readable medium described herein may further include operations, features, means, or instructions for determining that the field of the downlink control information message includes a total downlink assignment index field, and receiving the uplink control information and hybrid automatic repeat request information based on a value of the total downlink based on the multiplexing configuration.

In some examples of the method, apparatuses, and non-transitory computer-readable medium described herein, the value of the total downlink assignment index field indicates an uplink shared channel resource or an uplink control channel resource for transmission of the uplink control information.

In some examples of the method, apparatuses, and non-transitory computer-readable medium described herein, receiving he hybrid automatic repeat request information further may include operations, features, means, or instructions for determining a semi-static configuration or a dynamic configuration for generating the hybrid automatic repeat request information, where the semi-static configuration or the dynamic configuration may be associated with a downlink shared channel codebook.

Some examples of the method, apparatuses, and non-transitory computer-readable medium described herein may further include operations, features, means, or instructions for determining that the uplink control channel transmission includes one or more channel state information reports for the uplink shared channel, and receiving the one or more channel state information reports on the uplink shared channel or the uplink control channel based on the multiplexing configuration.

Some examples of the method, apparatuses, and non-transitory computer-readable medium described herein may further include operations, features, means, or instructions for receiving the one or more channel state information reports based on a radio resource control configuration that indicates whether uplink control information may be to be multiplexed on the uplink shared channel or the uplink control channel.

BRIEF DESCRIPTION OF THE DRAWINGS

FIGS. 13 through 18 show flowcharts illustrating methods that support dynamic uplink control multiplexing between physical uplink channels in accordance with aspects of the present disclosure.

DETAILED DESCRIPTION

Figure 1:
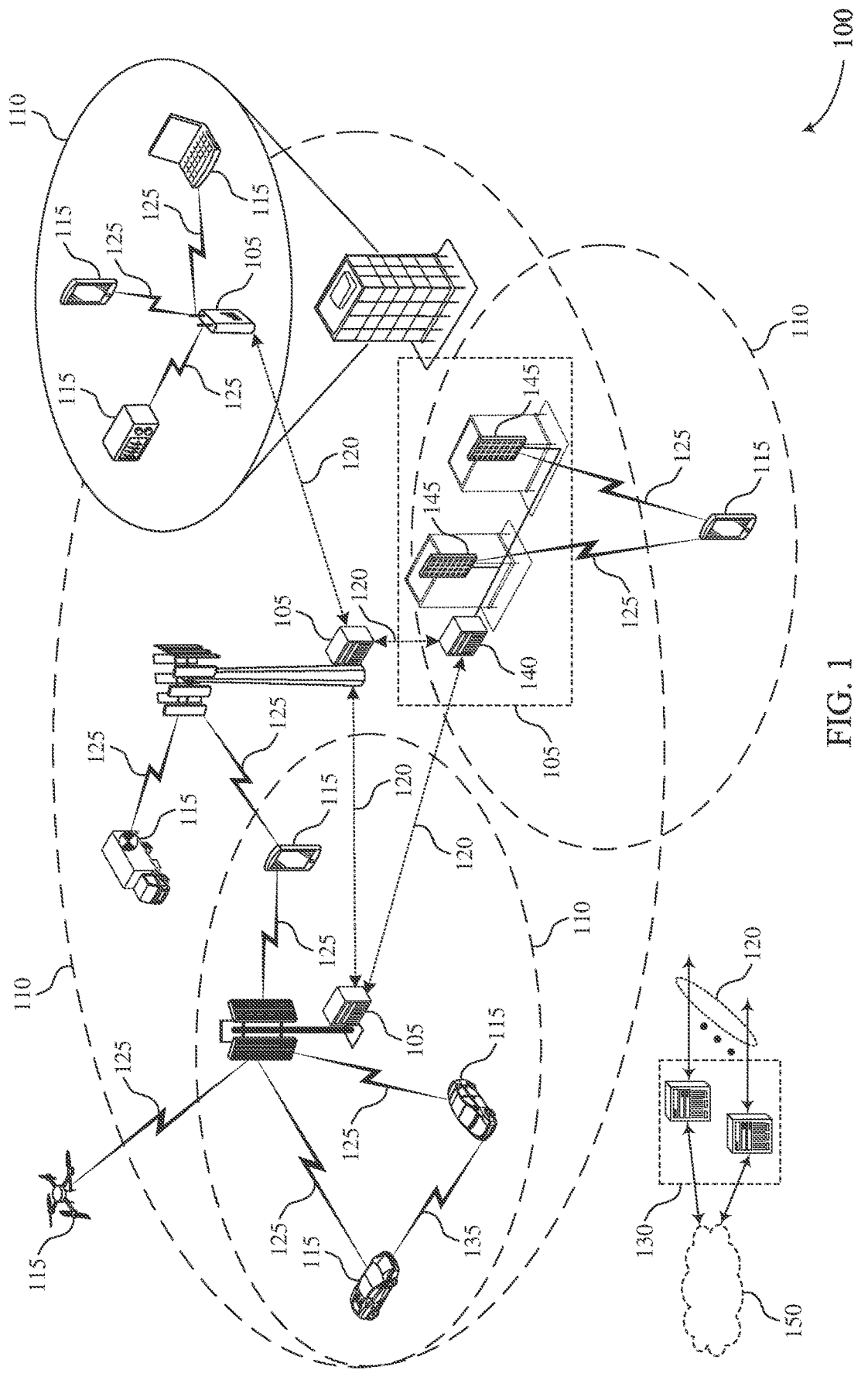
FIG. 1 illustrates an example of a wireless communications system that supports dynamic uplink control multiplexing between physical uplink channels in accordance with aspects of the present disclosure.

In some wireless communications systems, a user equipment (UE) may implement techniques that support simultaneous transmissions (e.g., transmissions that at least partially overlap in time) on different uplink physical channels on one or more serving cells. For example, the UE may support simultaneous transmissions of data on a physical uplink shared channel (PUSCH), which may be associated with a first cell, and control information such as uplink control information (UCI) on a physical uplink control channel, which may be associated with a second cell which may be the same or a different cell as the first cell. In some cases, however, transmissions on the PUSCH and the PUCCH overlap in time, and the UE may be configured to multiplex the UCI on either the PUSCH or the PUCCH based on the overlap.

A base station may flexibly (e.g., semi-statically or dynamically) schedule the transmission of the UCI from the UE in order to avoid interference and to increase communications reliability for the transmission of the UCI. The base station may determine a multiplexing configuration for the UCI that includes an explicit or implicit indication of whether the UE is to multiplex the UCI on the PUSCH, or whether the UE is to multiplex the UCI with the PUCCH.

In one implementation, the UE may receive a radio resource control (RRC) configuration message including an RRC selector (e.g., UCI_multiplex) that indicates that an uplink resource to multiplex the UCI. For example, the RRC configuration indicates multiplexing the UCI on the PUCCH, and in other cases, the RRC configuration indicates multiplexing the UCI on the PUSCH. Additionally or alternatively, the UE may use the indicated uplink resource (e.g., PUSCH or PUCCH) to transmit hybrid automatic repeat request (HARQ) feedback.

In some implementations, the multiplexing configuration may be determined based on the type of information included in the UCI for the PUCCH or the PUSCH, such as different channel status information (CSI) transmitted in the UCI. For example, the multiplexing configuration may be based on various configurations for one or more of a-periodical CSI (A-CSI), semi-persistent CSI (SP-CSI), and periodical CSI (P-CSI) included in the UCI.

According to some aspects, the UE may determine the multiplexing configuration for the UCI based on an indication in downlink control information (DCI). In some examples, the UE may identify a field in the DCI that indicates the multiplexing configuration for the UCI (e.g., based on a value of the field, or an indicated uplink resource to use for transmitting the UCI). For example, the field of the DCI may indicate that the uplink resource is PUCCH, and the UE may multiplex the UCI on the PUCCH. In another example, the field of the DCI may indicate that the uplink resource is PUSCH, and the UE may multiplex the UCI on the PUSCH. In some examples, the field of the DCI may be a total downlink assignment index (T-DAI) field.

In some cases, implementing the multiplexing configuration may increase flexibility by indicating that the UE may transmit the UCI on either the PUCCH or the PUSCH. For example, the base station or the UE may determine that interference is present on the PUSCH, or that signal strength or signal quality is less than that of the PUCCH. In such cases, the UE may determine to transmit the UCI in the PUCCH based on the multiplexing configuration. In other cases, for example, in cases where signal quality on the PUSCH satisfies a threshold quality, or to reduce overall signaling overhead, the UE may determine to multiplex the UCI with the PUSCH and may refrain from transmitting the PUCCH.

Aspects of the disclosure are initially described in the context of wireless communications systems. Aspects of the disclosure are further illustrated by and described with reference to apparatus diagrams, system diagrams, process flow diagrams, uplink channel transmission schemes, and flowcharts that relate to dynamic uplink control multiplexing between physical uplink channels. Some aspects of the disclosure may be described in the context of signaling communications between a base station and a UE, or other network devices described herein.

FIG. 1 illustrates an example of a wireless communications system 100 that supports dynamic uplink control multiplexing between physical uplink channels in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples, (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max}, N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof.

For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In wireless communications system 100, a UE 115 may implement techniques that support simultaneous transmissions on different uplink physical channels on one or more cells (e.g., serving cells, primary cells, or secondary cells). For example, the UE 115 may support simultaneous transmissions of data on a PUSCH that is associated with a first cell, and control information such as UCI on a physical uplink control channel associated with a second cell. In some cases, however, transmissions on the PUSCH and the PUCCH overlap in time, and the UE 115 may determine to multiplex the UCI with the PUCCH or the PUSCH based on a multiplexing configuration received from a base station 105. For example, the multiplexing configuration for the UCI may be transmitted by the base station 105 and may include an explicit or implicit indication of whether the UE 115 is to multiplex the UCI on the PUSCH or on the PUCCH.

The multiplexing configuration may be indicated to the UE 115 in one or more messages from the base station 105. In one example, the UE 115 may receive an RRC configuration message that indicates that an uplink resource to multiplex the UCI. In another example, the multiplexing configuration may be determined based on the type of information included in the UCI for the PUCCH or the PUSCH, such as different CSI transmitted in the UCI. In another example, the UE may determine the multiplexing configuration for the UCI based on an indication in DCI. In any of the examples, the multiplexing configuration includes an indication as to whether the UE 115 is to multiplex the UCI on the PUCCH or PUSCH.

Figure 2:
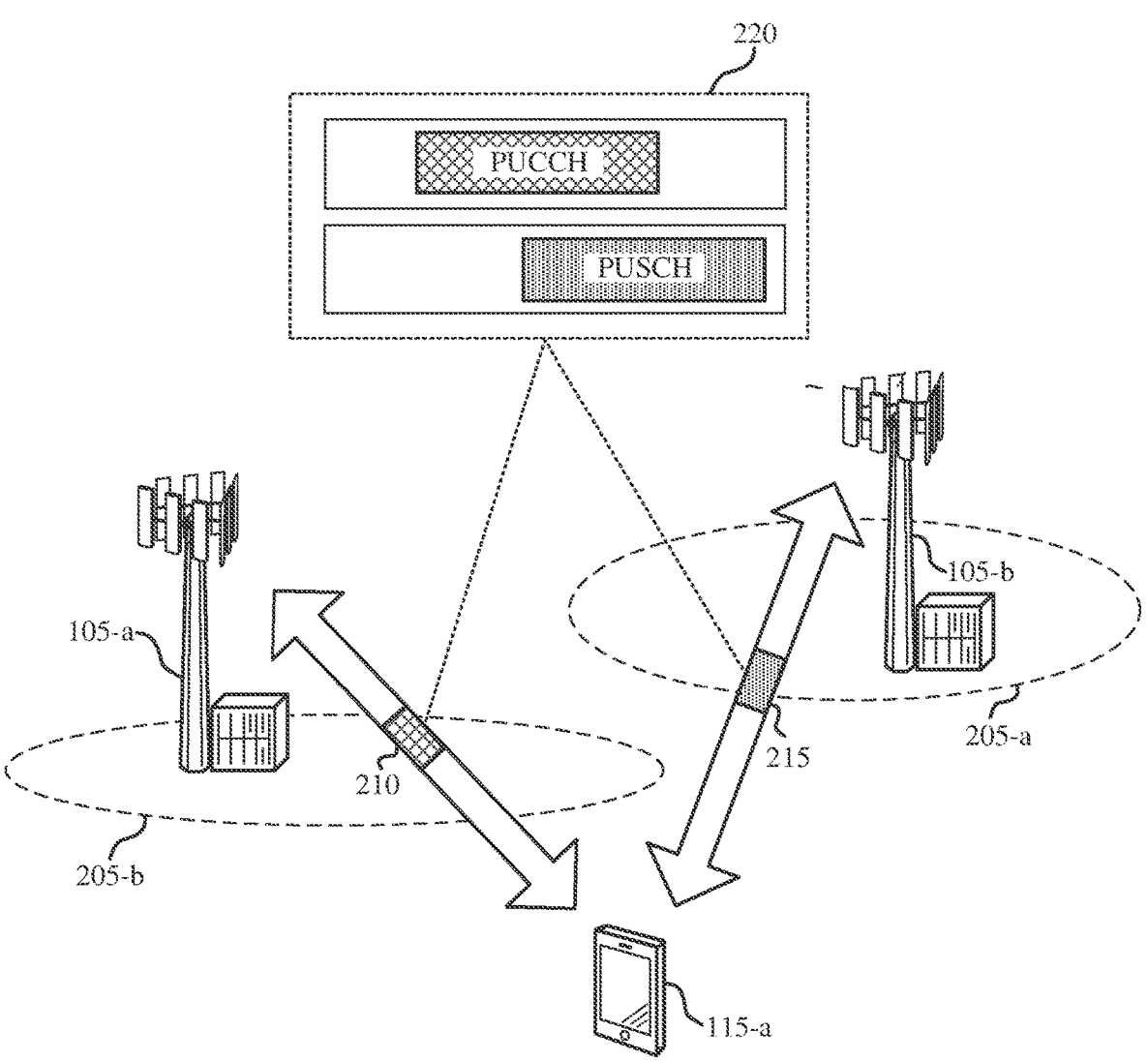
FIG. 2 illustrates an example of a wireless communications system that supports dynamic uplink control multiplexing between physical uplink channels in accordance with aspects of the present disclosure.

FIG. 2 illustrates an example of a wireless communications system 200 that supports dynamic uplink control multiplexing between physical uplink channels in accordance with aspects of the present disclosure. In some examples, wireless communications system 200 may implement aspects of wireless communications system 100. For example, the wireless communications system 200 may implement a UE 115-*a* capable of simultaneously communicating with base stations 105-*a* and 105-*b*, each of which may be examples of UEs 115 and base stations 105 described with reference to FIG. 1.

Wireless communications system 200 may include a number of devices such as UE 115-*a*, which may be in communication with base stations 105-*a* and 105-*b* serving one or more serving cells 205-*a* and 205-*b*. In some cases, the cells 205-*a* and 205-*b* may represent the same cell or different serving cells. The UE 115-*a* may implement carrier aggregation, and may support simultaneous transmissions on different carriers for the different serving cells 205-*a* and 205-*b*. For example, the UE 115-*a* may transmit data 215 on an uplink shared channel (e.g., a PUSCH transmission) associated with the first cell 205-*a*, and may transmit control information 210 such as UCI on an uplink control channel (e.g., a PUCCH transmission) associated with the second cell 205-*b*. In some cases, however, transmissions of the PUSCH and the PUCCH may at least partially overlap during the time duration 220, and the UE 115-*a* may determine to multiplex or "piggyback" the UCI on the PUSCH. In such cases, the UE 115-*a* may drop the transmission of the PUCCH 210, and send the PUSCH transmission 215 including the UCI.

In some cases, the UE 115-*a* may transmit a UE capability message (e.g., "sim-PUCCH-PUSCH-UL") in a message or as part of a UE capability reporting procedure, which may indicate that the UE 115-*a* supports simultaneous transmission of PUCCH and PUSCH. Additionally or alternatively, the UE 115-*a* may receive an RRC configuration message (e.g., "sim-PUCCH-PUSCH") that may configure the UE 115-*a* for simultaneous transmission of PUCCH and PUSCH. For example, an enabled RRC configuration may indicate support for the simultaneous transmission, while a disabled RRC configuration may indicate support for single transmissions, or the serving cell associated with the PUCCH is not configured with a transmission configuration indicator (TCI) state.

The UE 115-*a* may determine whether to transmit control information (e.g., UCI) on the PUSCH based on the capability to support simultaneous transmission. For example, the UE 115-*a* may identify that transmissions of the PUSCH and the PUCCH at least partially overlap in time, and may transmit control information associated with the PUCCH on the PUSCH based on identifying the overlap. In addition, the base station may flexibly or dynamically schedule the transmission of the UCI in order to avoid interference or to improve communications reliability for transmissions of the UCI.

In some cases, however, the UE 115-*a* may identify a capability to transmit UCI on either the PUSCH or the PUCCH. For example, the UE 115-*a* may determine that transmitting the UCI on the PUCCH may increase reliability of UCI communications. For example, the UE 115-*a* may determine that interference is present on the PUSCH, or that signal strength or signal quality is less than that of the PUCCH. In such cases, the UE 115-*a* may determine to transmit the UCI in the PUCCH. In other cases, for example, in cases where signal quality on the PUSCH satisfies a threshold quality, or to reduce overall signaling overhead, the UE 115-*a* may determine to multiplex the UCI with the PUSCH and may drop the PUCCH. The UCI may contain one or more of HARQ information, scheduling requests, CSI or channel quality information (CQI), or other information to support the scheduling of communications at the UE 115-*a*. As such, support for a capability of UE 115-*a* to transmit the UCI on either the PUSCH or the PUCCH may increase the likelihood that the UCI is successfully received and processed by a base station, which may increase communications quality, reduce latency, and support efficient scheduling of the UE 115-*a*.

The UE 115-*a* may determine whether to multiplex the UCI on the PUSCH (and refrain from transmitting the PUCCH), or whether to transmit the UCI on the PUCCH simultaneously with the PUSCH based on a multiplexing configuration or based on other signaling received from one or more of base stations 105-*a* and 105-*b*. In some other examples, the UE 115-*a* may determine a multiplexing configuration based on channel information or other network conditions.

In one implementation, the UE 115-*a* may determine a multiplexing configuration based on RRC signaling received from the base station 105-*a* or 105-*b*. The UE 115-*a* may receive an RRC configuration message including an RRC selector (e.g., UCI_multiplex) that indicates that an uplink resource to multiplex the UCI. For example, in cases where the RRC configuration indicates UCI_multiplex=PUCCH, the UE 115-*a* may multiplex the UCI on the PUCCH. In other cases, where the RRC configuration indicates UCI_multiplex=PUSCH, the UE 115-*a* may multiplex the UCI with the PUSCH. In yet other cases that the UE 115-*a* does not receive the RRC configuration, the UE 115-*a* may multiplex the UCI on the PUSCH. The selection of the multiplexing configuration via RRC signaling may support explicit selection of the uplink resource for carrying UCI.

In some examples, the UE 115-*a* may generate HARQ feedback in UCI based on the RRC configuration. In cases where a PUCCH transmission in cell 205-*b* overlaps in time with a PUSCH transmission, the UE 115-*a* may implement UCI selection based on the RRC configuration. For example, in cases where the RRC parameter "UCI_multiplex" is configured as "UCI_multiplex=PUSCH" or when the RRC parameter "UCI_multiplex" is not configured, the UE 115-*a* may multiplex the UCI (including HARQ feedback of ACK/NACK information) in the PUSCH transmission and drops the PUCCH transmission. In some other cases, where the RRC parameter "UCI_multiplex" is configured as "UCI_multiplex=PUCCH", the UE 115-*a* may transmit both the PUCCH and PUSCH on respective serving cells, and may multiplex the UCI on the PUCCH.

In another implementation, the multiplexing configuration may be determined based on the type of information included in the UCI for the PUCCH or the PUSCH. For example, in cases that a-periodical CSI (A-CSI) or semi-persistent CSI (SP-CSI) report is to be transmitted on the PUSCH, and a periodical CSI (P-CSI) or SP-CSI report is to be transmitted on PUCCH, the UE may transmit the PUSCH and may drop the PUCCH transmission including the CSI report in the UCI for the PUCCH when the PUCCH overlaps with the PUSCH in time. In another example, if no CSI report is to be transmitted on the PUSCH, and P-SCI or SP-CSI report is to be transmitted on PUCCH, the UCI including the CSI report for PUCCH is multiplexed on the PUSCH, and the PUSCH is transmitted with UCI of PUCCH. In either example, if UCI of PUCCH is carried on PUSCH, the UE 115-*a* may drop the PUCCH.

In another implementation, the UE 115-*a* may determine the multiplexing configuration for the UCI based on an indication in DCI. In some examples, the DCI may have a field that is allocated to the indication, and the UE 115-*a* may determine the multiplexing configuration for the UCI based on a value of the field, or an indicated uplink resource to use for transmitting the UCI. For example, the field of the DCI may indicate that the uplink resource for transmitting the UCI is PUCCH, and the UE 115-*a* may multiplex the UCI on the PUCCH. In another example, the field of the DCI may indicate that the uplink resource for transmitting the UCI is PUSCH, and the UE 115-*a* may multiplex the UCI on the PUSCH. In another example, the DCI may lack a field to indicate an uplink resource to transmit the UCI, and the UE 115-*a* may multiplex the UCI on the PUSCH.

In some cases, the UE 115-*a* may implement UCI selection by configuration, for example, in cases where the UCI includes one or more CSI reports. In some cases, a PUCCH containing CSI reports overlaps in time with a PUSCH, the uplink resource (PUCCH or PUSCH) to carry the CSI reports of the PUCCH may be determined based on signaling such as an RRC configuration or other control signaling.

In one example, if the UE 115-*a* identifies that the PUSCH contains no CSI reports, and if there is no RRC configuration "UCI_multiplex," the UE 115-*a* may multiplex the UCI containing the CSI reports on the PUSCH (e.g., the UE 115-*a* transmits the CSI reports of the PUCCH on the PUSCH). In another example, if the UE 115-*a* determines that the PUSCH contains CSI reports, and if the RRC configuration is configured as "UCI_multiplex=PUCCH," the UE 115-*a* may transmit both the PUCCH with its own CSI and PUSCH with its own CSI on respective serving cells 205-*a* and 205-*b*.

In some other cases, the UE 115-*a* may identify the multiplexing configuration based on a value of a total downlink assignment index (T-DAI) in the DCI. In some cases, an existing T-DAI field may be changed or repurposed to include the multiplexing configuration. In a first example, a PUCCH in cell 205-*b* overlaps in time with a PUSCH which is scheduled by a given uplink scheduling DCI format (e.g., DCI format 0_1 or 0_2 as in 3GPP NR specifications) in cell 205-*a*, and the UE 115-*a* may determine that whether a T-DAI field in the DCI is 1 or not. Based on the indication in the T-DAI field of the DCI, if the T-DAI field indicates 1, the UE 115-*a* may multiplex UCI in the PUSCH transmission, and may drop the PUCCH transmission. The UE 115-*a* may generate HARQ feedback of ACK/NACK information which may be transmitted on the PUSCH. Based on the indication in the T-DAI field of the DCI, if the T-DAI field indicates 0, the UE 115-*a* may multiplex UCI in the PUCCH transmission, and may also transmit the PUSCH simultaneously which overlaps with the PUCCH in time. The UE 115-*a* may generate HARQ feedback of ACK/NACK information which may be transmitted on the PUCCH. In such examples, the UE 115-*a* is configured with a given semi-static HARQ feedback configuration (e.g., the HARQ codebook size is configured to be semi-static such that the RRC parameters "pdsch-HARQ-ACK-Codebook=semi-static"). In some aspects, the HARQ feedback of ACK/NACK information may be not in a fallback HARQ feedback mode, (e.g., a mode in which ACK/NACK codebook in the HARQ feedback of ACK/NACK information has a size of 1) and the UE 115-*a* may report HARQ feedback of ACK/NACK information for a semi-persistent scheduling (SPS) physical downlink shared channel (PDSCH) release indicated by DCI format 1_0 with counter DAI field value of 1, or for a PDSCH reception scheduled by DCI format 1_0 with counter DAI field value of 1 on the primary cell, or for SPS PDSCH receptions.

In another example, the PUSCH transmission may be scheduled by a given uplink scheduling DCI format (e.g., DCI format 0_1 or 0_2 as in 3GPP NR specifications) in cell 205-*a*, and the UE 115-*a* may determine that whether a T-DAI field in the DCI is 4 or not. Based on the indication in the T-DAI field of the DCI, if the T-DAI field is not 4, the UE 115-*a* may multiplex UCI in the PUSCH transmission, and may drop the PUCCH transmission. The UE 115-*a* and may generate HARQ feedback of ACK/NACK information which may be transmitted on the PUSCH. In such examples, the UE 115-*a* is configured with a given dynamic HARQ feedback configuration (e.g., the HARQ codebook size is configured to be dynamic such that the RRC parameters pdsch-HARQ-ACK-Codebook=dynamic). In some other examples, the UE 115-*a* may transmit both the PUCCH and PUSCH on respective cells 205-*a* and 205-*b*, and the UCI may not be transmitted on the PUSCH. For example, based on the indication in the T-DAI field of the DCI, if the T-DAI field indicates 4, the UE 115-*a* may multiplex UCI in the PUCCH transmission, and may also simultaneously transmit the PUSCH which overlaps with the PUCCH in time. The UE 115-*a* and may generate HARQ feedback of ACK/NACK information which may be transmitted on the PUCCH.

Figure 3:
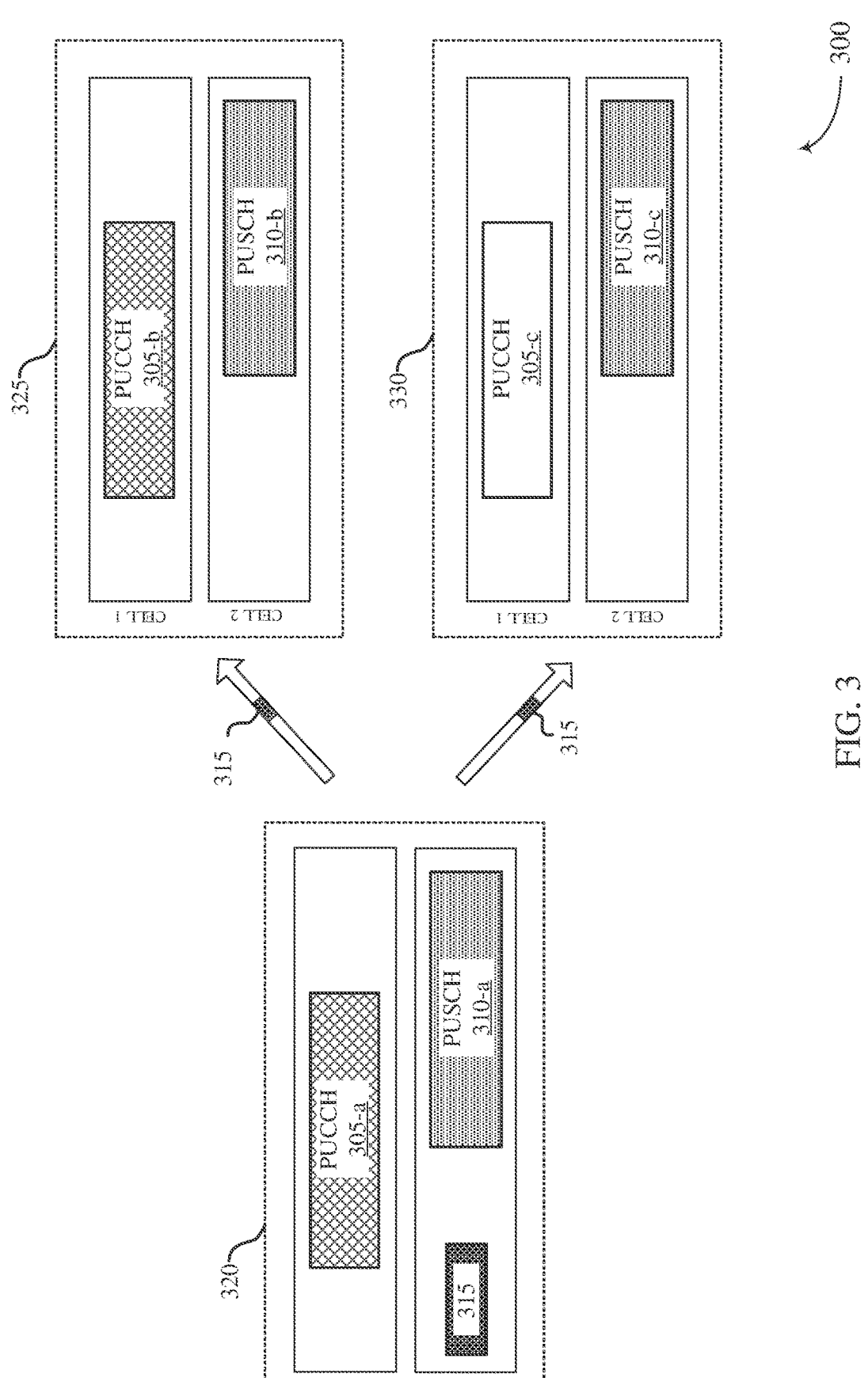
FIG. 3 illustrates an example of a physical uplink channel transmission scheme that supports dynamic uplink control multiplexing between physical uplink channels in accordance with aspects of the present disclosure.

FIG. 3 illustrates an example of a physical uplink channel transmission scheme 300 that supports dynamic uplink control multiplexing between physical uplink channels in accordance with aspects of the present disclosure. In some examples, physical uplink channel transmission scheme 300 may implement aspects of wireless communication system 100. For example, physical uplink channel transmission scheme 300 may be implemented by various devices such as UEs 115 and base stations 105 in a wireless communications system described with reference to FIGS. 1 and 2.

In some cases, a UE may support simultaneous transmissions for physical uplink channels such as the PUSCH and the PUCCH. The UE may transmit control information such as UCI on an uplink control channel (e.g., PUCCH 305-*a*) associated with a first cell (e.g., cell 1), and may transmit data on an uplink data channel (e.g., PUSCH 310-*a*) associated with a second cell (e.g., cell 2). The first cell and the second cell may be the same serving cell or different serving cells. In some cases, the transmissions of the PUSCH 310-*a* and the PUCCH 205-*a* may at least partially overlap during the duration 320.

The UE may receive an indication 315 in downlink signaling (e.g., RRC, DCI, etc.) that may identify a multiplexing configuration for the UE to implement for transmitting UCI in the case of overlapping PUCCH and PUSCH transmissions. The multiplexing configuration may be an explicit or implicit indication which may instruct the UE whether to send the UCI with a PUSCH 310 or with a PUCCH 315.

In one example, the UE may receive an indication 315 in a downlink message from one or more base stations. The indication 315 may indicate a multiplexing configuration that instructs the UE to transmit the UCI on the PUCCH resource 305-*b*. The multiplexing configuration may further instruct the UE to simultaneously transmit the PUCCH 305-*b* and the PUSCH 310-*b* during the duration 325.

In another example, the UE may receive an indication 315 in a downlink message from one or more base stations. The indication 315 may indicate a multiplexing configuration that instructs the UE to multiplex or "piggyback" the UCI on the PUSCH resource 310-*c*. The multiplexing configuration may further instruct the UE to refrain from transmitting or to drop the PUCCH 305-*c* during the duration 330 based on the multiplexing configuration.

Figure 4:
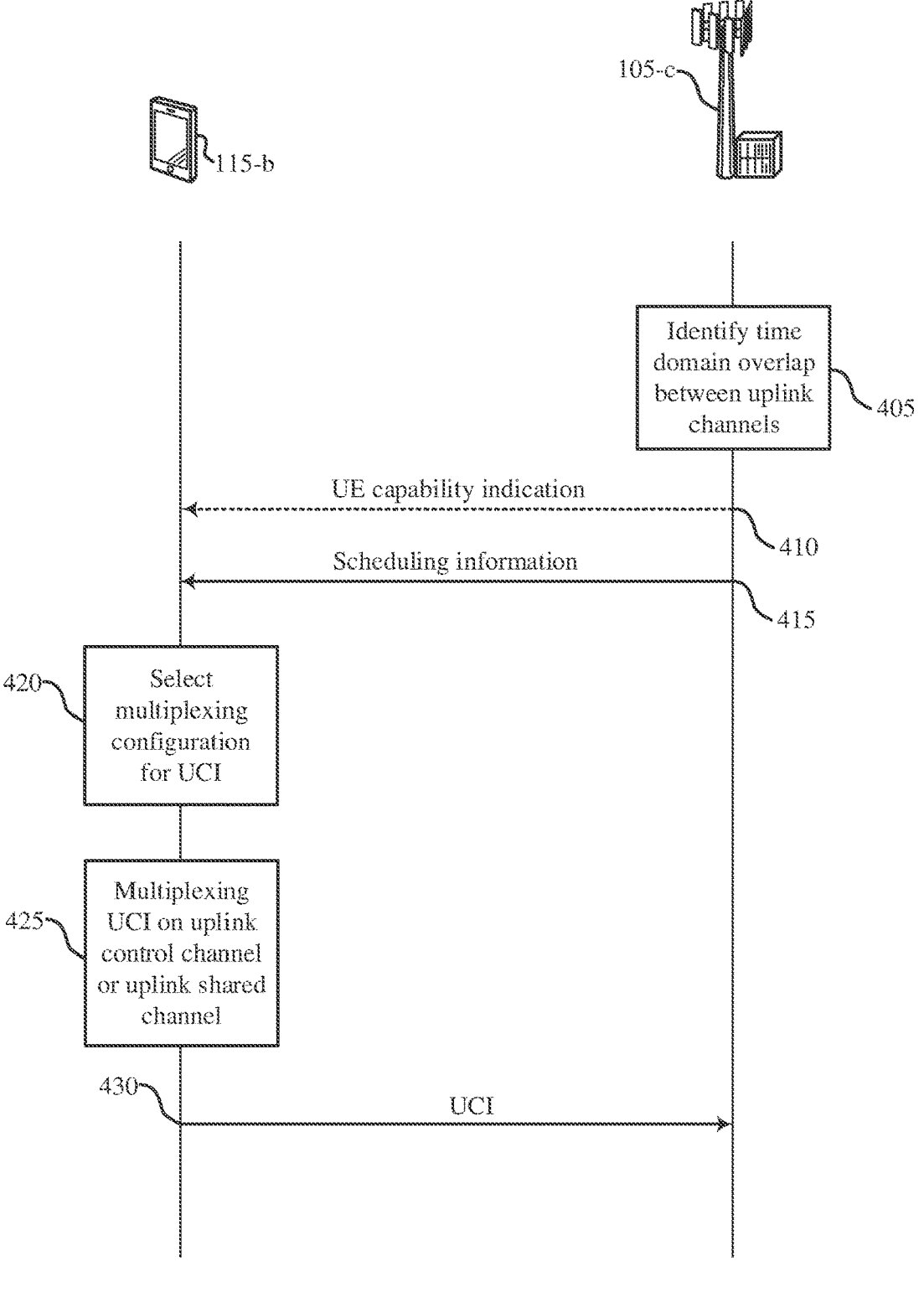
FIG. 4 illustrates an example of a process flow that supports dynamic uplink control multiplexing between physical uplink channels in accordance with aspects of the present disclosure.

FIG. 4 illustrates an example of a process flow 400 that supports dynamic uplink control multiplexing between physical uplink channels in accordance with aspects of the present disclosure. In some examples, process flow 400 may implement aspects of wireless communications system 100. For example, process flow 400 may implement a UE 115-b and a base station 105-c, which may correspond to UEs 115 and base stations 105 described with reference to FIGS. 1-3.

At 405, the base station 105-c may identify a time domain overlap between scheduled transmissions of an uplink shared channel (e.g., PUSCH) and an uplink control channel (e.g., PUCCH). In some cases, the base station 105-c may identify a capability of the UE 115-b to support simultaneous transmissions of the scheduled PUSCH and PUCCH, and may transmit an indication of the UE capability to UE 115-b at 410.

At 415, the base station 105-c may transmit scheduling information to the UE 115-b. The scheduling information may include an indication of the time domain overlap and a multiplexing configuration for the UE 115-b to transmit uplink control information. The base station 105-c may in some cases flexibly or dynamically schedule the multiplexing configuration of the UCI in order to avoid interference or to increase communications reliability for transmissions of the UCI from the UE 115-b.

At 420, the UE 115-b may receive the scheduling information from the base station 105-c, and may select a multiplexing configuration for the uplink control information based on the scheduling information. In some cases, the UE 115-b may select the multiplexing configuration based on the indicated capability of the UE 115-b to support PUSCH transmissions on a first cell that at least partially overlap in time with PUCCH transmissions on a second cell.

The multiplexing configuration may indicate an uplink shared channel resource (e.g., PUSCH) or an uplink control channel resource (e.g., PUCCH) for the transmission of the UCI, and selection of the multiplexing configuration may be explicit or implicit based on the received scheduling information.

In one example, the UE 115-b may receive an RRC message including an RRC configuration that indicates the multiplexing configuration for the UCI, and the UE may multiplex the UCI on the PUSCH or the PUCCH based on the RRC indicator or the RRC configuration. In some cases, the RRC configuration may include an RRC selection indicator, and a value of the RRC selection indicator may indicate whether the UCI is to be multiplexed with the PUCCH or with the PUSCH when the PUCCH overlaps with the PUSCH in time. The UE 115-b may generate HARQ feedback of ACK/NACK information based on the RRC configuration, and may transmit the HARQ feedback of ACK/NACK information to base station 105-c using the uplink resource indicated in the multiplexing configuration.

In some other cases, the UE 115-b may determine that the multiplexing configuration is absent from the RRC configuration, and the UE 115-b may determine that the UCI is to be multiplexed with the PUCCH based on the absent multiplexing configuration.

In some examples, the UE 115-b may select the multiplexing configuration based on a type of information associated with the UCI. The UE 115-b may multiplex the UCI on the PUCCH or the PUSCH based on the UCI type. For example, the UCI may be associated with one or more CSI types (e.g., P-CSI, A-CSI, SP-CSI), and the UE 115-b may select the multiplexing configuration based on one or more CSI types included in the UCI.

In some other implementations, the scheduling information may be a DCI transmitted from the base station 105-c. The UE 115-b may receive the DCI at 420, and may select the multiplexing configuration for the UCI based on a field of the DCI. For example, the field of the DCI may indicate an uplink shared channel resource (e.g., PUSCH) or an uplink control channel resource (e.g., PUCCH) for transmission of the uplink control information when the PUCCH and the PUSCH overlaps in time.

In some examples, the field of the DCI may be a T-DAI field, and the UE 115-b may select the multiplexing configuration based on a value of the T-DAI field, and may generate and transmit HARQ feedback of ACK/NACK information based on the multiplexing configuration. For example, the UE 115-b may transmit HARQ feedback of ACK/NACK information using the uplink resource indicated in the multiplexing configuration for the UCI. The UE 115-b may determine a semi-static configuration or a dynamic configuration for generating the HARQ information associated with a downlink shared channel codebook (e.g., pdsch-HARQ-ACK-Codebook=semi-static or pdsch-HARQ-ACK-Codebook=dynamic).

In some examples, the UE 115-b may determine that the UCI includes one or more CSI reports for the PUSCH, and may select the PUSCH or the PUCCH for transmission of the one or more CSI reports based on the multiplexing configuration. In some cases, the PUSCH may not be associated with the one or more CSI reports, and an RRC configuration may not indicate the multiplexing configuration. In such cases, the CSI reports of the PUCCH may be multiplexed on the PUSCH. In some other cases, the PUSCH may be associated with the one or more CSI reports, and the RRC configuration may indicate the multiplexing configuration for PUCCH. In such cases, the CSI reports of PUCCH may be multiplexed on the PUCCH which is transmitted simultaneously with the PUSCH.

At 425, the UE 115-b may multiplex the UCI on the PUCCH or the PUCCH based on the selected multiplexing configuration, and at 430, the UE 115-b may transmit UCI to the base station 105-d on the PUCCH or the PUSCH based on the multiplexing.

Figure 5:
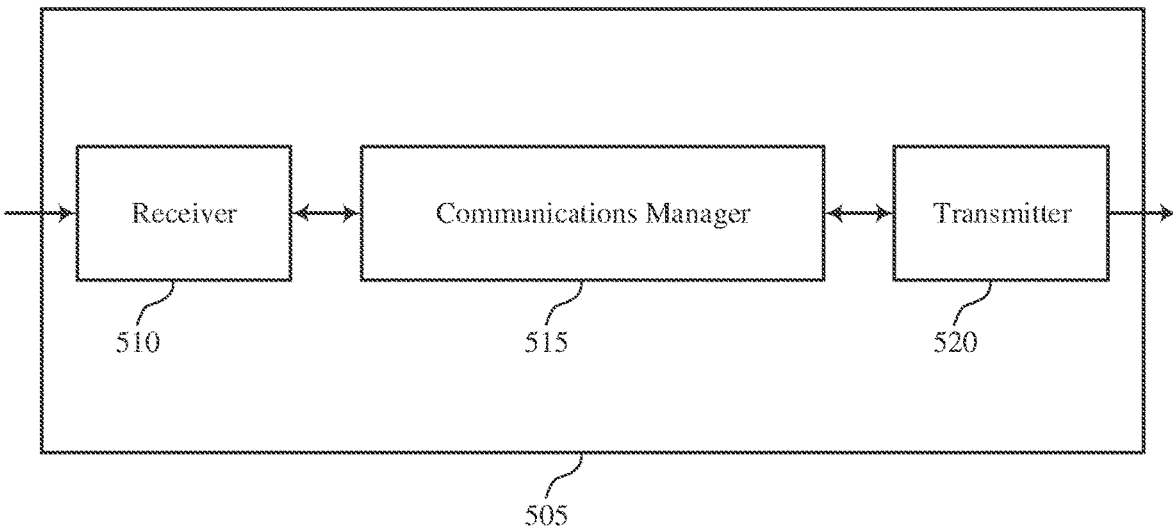
FIGS. 5 and 6 show block diagrams of devices that support dynamic uplink control multiplexing between physical uplink channels in accordance with aspects of the present disclosure.

FIG. 5 shows a block diagram 500 of a device 505 that supports dynamic uplink control multiplexing between physical uplink channels in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to dynamic uplink control multiplexing between physical uplink channels, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive scheduling information for the transmission of uplink control information, the scheduling information indicating a time domain overlap between an uplink shared channel and an uplink control channel, select a multiplexing configuration for the uplink control information based on the scheduling information, multiplex the uplink control information on the uplink shared channel or the uplink control channel based on the multiplexing configuration, and transmit the uplink control information based on the multiplexing. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
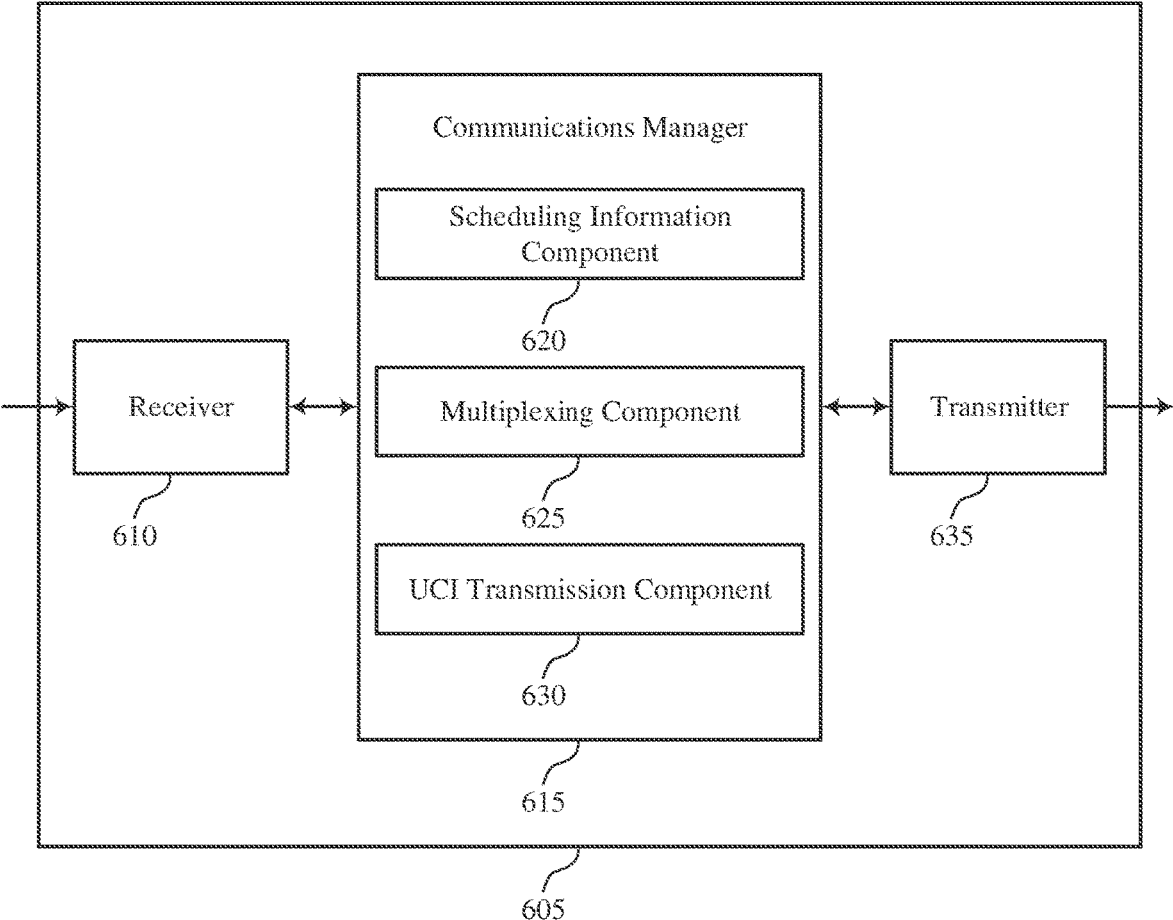

FIG. 6 shows a block diagram 600 of a device 605 that supports dynamic uplink control multiplexing between physical uplink channels in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to dynamic uplink control multiplexing between physical uplink channels, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a scheduling information component 620, a multiplexing component 625, and an UCI transmission component 630. The communications manager 615 may be an example of aspects of the communications manager 810 described herein.

The scheduling information component 620 may receive scheduling information for the transmission of uplink control information, the scheduling information indicating a time domain overlap between an uplink shared channel and an uplink control channel.

The multiplexing component 625 may select a multiplexing configuration for the uplink control information based on the scheduling information and multiplex the uplink control information on the uplink shared channel or the uplink control channel based on the multiplexing configuration.

The UCI transmission component 630 may transmit the uplink control information based on the multiplexing.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
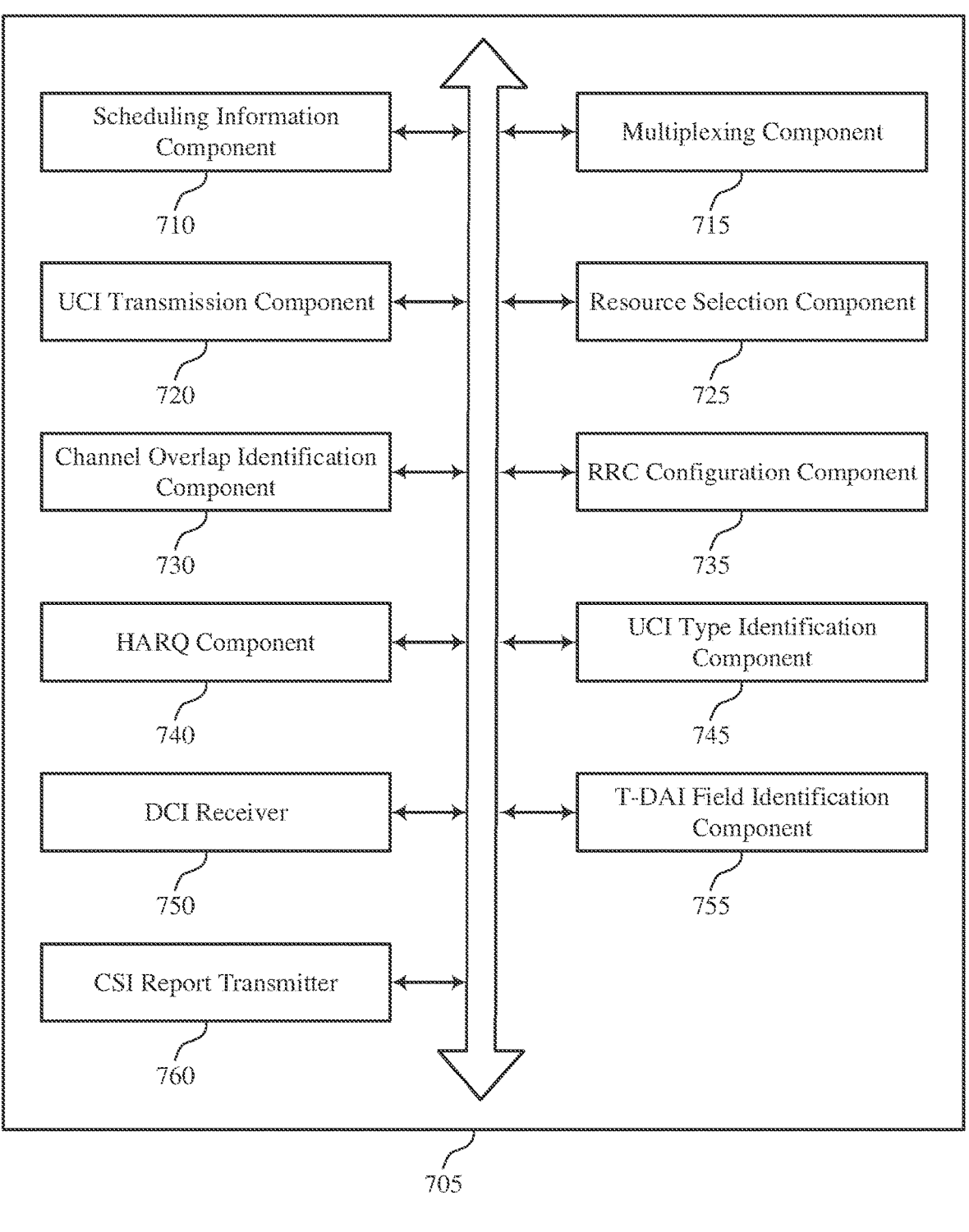
FIG. 7 shows a block diagram of a communications manager that supports dynamic uplink control multiplexing between physical uplink channels in accordance with aspects of the present disclosure.

FIG. 7 shows a block diagram 700 of a communications manager 705 that supports dynamic uplink control multiplexing between physical uplink channels in accordance with aspects of the present disclosure. The communications manager 705 may be an example of aspects of a communications manager 515, a communications manager 615, or a communications manager 810 described herein. The communications manager 705 may include a scheduling information component 710, a multiplexing component 715, an UCI transmission component 720, a resource selection component 725, a channel overlap identification component 730, a RRC configuration component 735, a HARQ component 740, an UCI type identification component 745, a DCI receiver 750, a T-DAI field identification component 755, and a CSI report transmitter 760. Each of these modules may communicate, directly or indirectly, with one another (e.g., via one or more buses).

The scheduling information component 710 may receive scheduling information for the transmission of uplink control information, the scheduling information indicating a time domain overlap between an uplink shared channel and an uplink control channel. The channel overlap identification component 730 may receive an indication of a capability of the UE to support the uplink shared channel transmission on a first cell that at least partially overlaps in time with the uplink control channel transmission on a second cell. In some examples, the multiplexing component 715 may select the multiplexing configuration based on the capability.

The multiplexing component 715 may select a multiplexing configuration for the uplink control information based on the scheduling information. In some examples, the multiplexing component 715 may multiplex the uplink control information on the uplink shared channel or the uplink control channel based on the multiplexing configuration.

In some examples, the multiplexing component 715 may multiplex the uplink control information on the uplink shared channel or on the uplink control channel based on the type of the uplink control information. In some examples, the multiplexing component 715 may select the multiplexing configuration for the uplink control information based on the one or more channel state information types.

The UCI type identification component 745 may determine a type of the uplink control information. In some examples, the UCI type identification component 745 may identify the type of the uplink control information as one or more channel state information types. In some cases, the one or more channel state information types include periodic channel state information, aperiodic channel state information, semi-persistent channel state information, or a combination thereof.

The CSI report transmitter 760 may determine that the uplink control channel transmission includes one or more channel state information reports for the uplink shared channel. In some examples, the CSI report transmitter 760 may select the uplink shared channel or the uplink control channel for transmission of the one or more channel state information reports based on the multiplexing configuration. In some examples, the CSI report transmitter 760 may select the uplink shared channel or the uplink control channel for transmission of the one or more channel state information reports.

In some examples, the multiplexing component 715 may multiplex the uplink control information on the uplink shared channel or on the uplink control channel based on the radio resource control configuration. In some examples, the multiplexing component 715 may multiplex the uplink control information on the uplink shared channel based on determining that the multiplexing configuration is absent from the radio resource control configuration. In some examples, determining that the multiplexing configuration includes a radio resource control configuration that indicates whether uplink control information is to be multiplexed on the uplink shared channel or the uplink control channel.

The RRC configuration component 735 may receive a radio resource control configuration that indicates the multiplexing configuration for the uplink control information. In some examples, the RRC configuration component 735 may identify a radio resource control selection indicator in the radio resource control configuration. In some examples, the resource selection component 725 may select the uplink shared channel or the uplink control channel for multiplexing the uplink control information based on a value of the radio resource control selection indicator.

In some examples, the RRC configuration component 735 may determine that the multiplexing configuration is absent from the radio resource control configuration. In some examples, the RRC configuration component 735 may determine that the radio resource control configuration indicates the uplink shared channel or the uplink control channel for multiplexing the uplink control information.

The HARQ component 740 may generate hybrid automatic repeat request information based on the multiplexing configuration. In some examples, the HARQ component 740 may determine a semi-static configuration or a dynamic configuration for generating the hybrid automatic repeat request information, where the semi-static configuration or the dynamic configuration are associated with a downlink shared channel codebook.

The DCI receiver 750 may receive, a downlink control information message from the base station. In some cases, the field of the downlink control information message indicates an uplink shared channel resource or an uplink control channel resource for transmission of the uplink control information. In some examples, the multiplexing component 715 may select the multiplexing configuration for the uplink control information based on a field of the downlink control information message. In some examples, the multiplexing component 715 may select the multiplexing configuration for the uplink control information based on a value of the total downlink assignment index field.

The T-DAI field identification component 755 may determine that the field of the downlink control information message includes a total downlink assignment index field. In some cases, the value of the total downlink assignment index field indicates an uplink shared channel resource or an uplink control channel resource for transmission of the uplink control information.

The resource selection component 725 may determine an uplink shared channel resource or an uplink control channel resource for the transmission of the uplink control information based on the multiplexing configuration. The UCI transmission component 720 may transmit the uplink control information based on the multiplexing.

Figure 8:
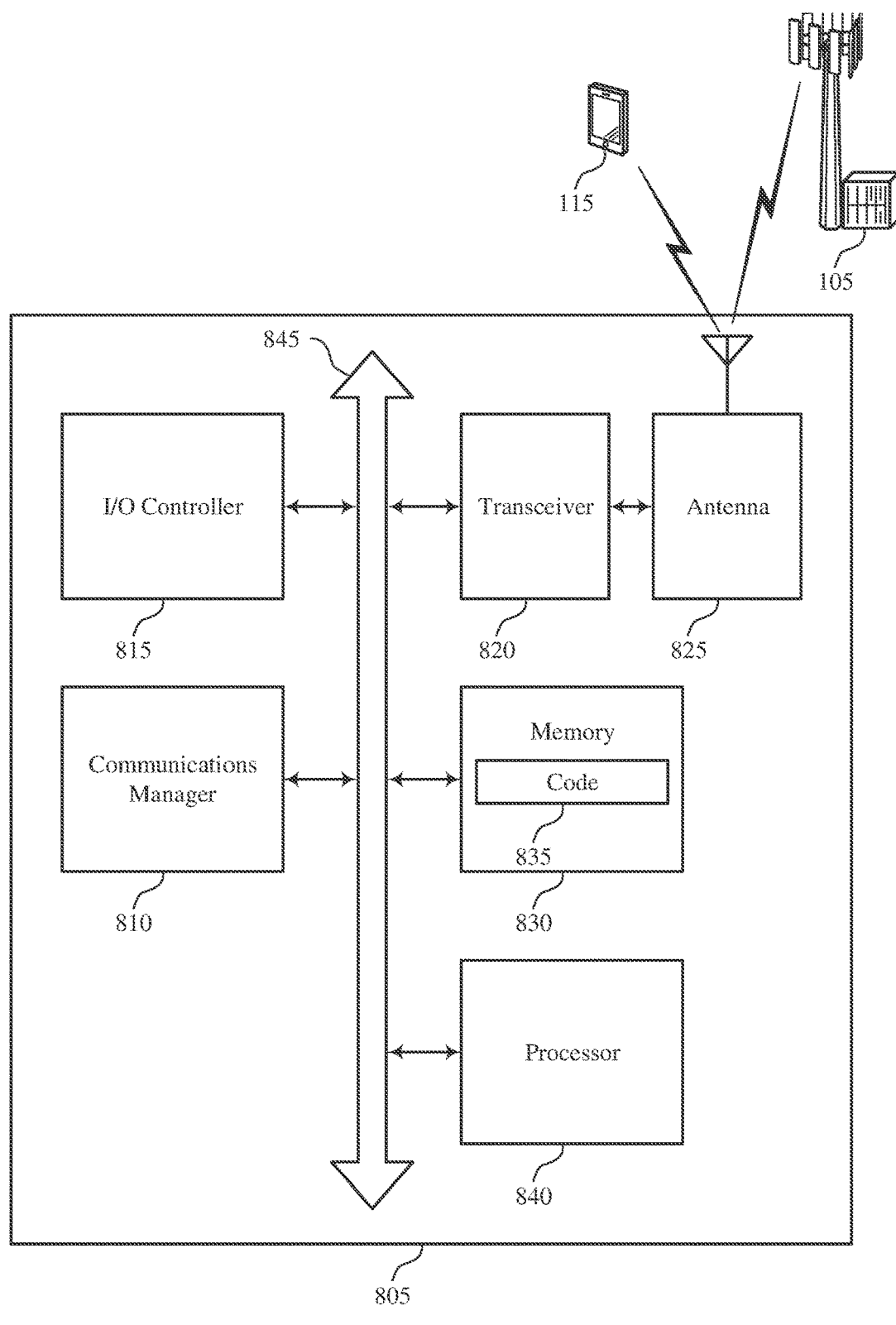
FIG. 8 shows a diagram of a system including a device that supports dynamic uplink control multiplexing between physical uplink channels in accordance with aspects of the present disclosure.

FIG. 8 shows a diagram of a system 800 including a device 805 that supports dynamic uplink control multiplexing between physical uplink channels in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive scheduling information for the transmission of uplink control information, the scheduling information indicating a time domain overlap between an uplink shared channel and an uplink control channel, select a multiplexing configuration for the uplink control information based on the scheduling information, multiplex the uplink control information on the uplink shared channel or the uplink control channel based on the multiplexing configuration, and transmit the uplink control information based on the multiplexing.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting dynamic uplink control multiplexing between physical uplink channels).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
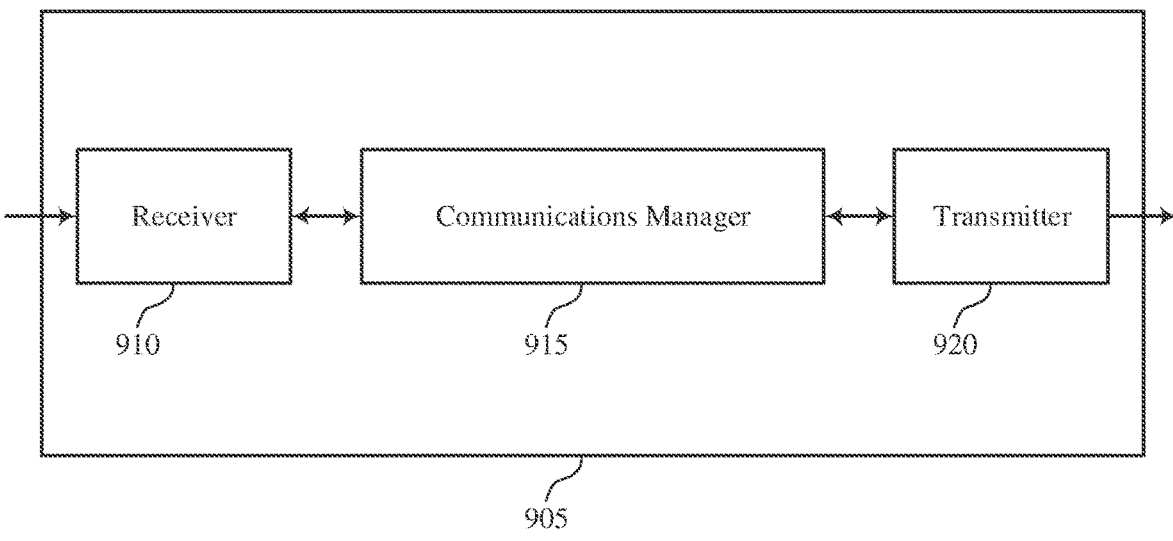
FIGS. 9 and 10 show block diagrams of devices that support dynamic uplink control multiplexing between physical uplink channels in accordance with aspects of the present disclosure.

FIG. 9 shows a block diagram 900 of a device 905 that supports dynamic uplink control multiplexing between physical uplink channels in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to dynamic uplink control multiplexing between physical uplink channels, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify a time domain overlap between an uplink shared channel and an uplink control channel, transmit, to a UE, scheduling information for the transmission of uplink control information, the scheduling information including an indication of the time domain overlap and a multiplexing configuration for the uplink control information, and receive the uplink control information based on the multiplexing configuration. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, includ-ing being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

In some examples, communications manager 915 may be implemented as an integrated circuit or chipset for a mobile device modem, and the receiver 910 and transmitter 920 may be implemented as analog components (e.g., amplifiers, filters, antennas, etc.) coupled with the mobile device modem to enable wireless transmission and reception.

The communications manager 915 as described herein may be implemented to realize one or more potential advantages. Various implementations may enable a base station to flexibly or dynamically schedule communications involving UCI from a UE on either an uplink control channel (e.g., PUCCH) or an uplink shared channel (e.g., PUSCH). At least one implementation may enable the communications manager 915 to effectively improve communications reliability for transmissions of UCI.

Based on implementing the multiplexing techniques as described herein, one or more processors of the device 905 (e.g., processor(s) controlling or incorporated with one or more of receiver 910, communications manager 915, and transmitter 920) may reduce signaling overhead based on multiplexing the UCI with data in a single PUSCH transmission. One or more techniques described herein may increase the likelihood that information in the UCI will successfully be received by the network for subsequent scheduling, which may in some cases reduce latency and increase overall communications efficiency.

Figure 10:
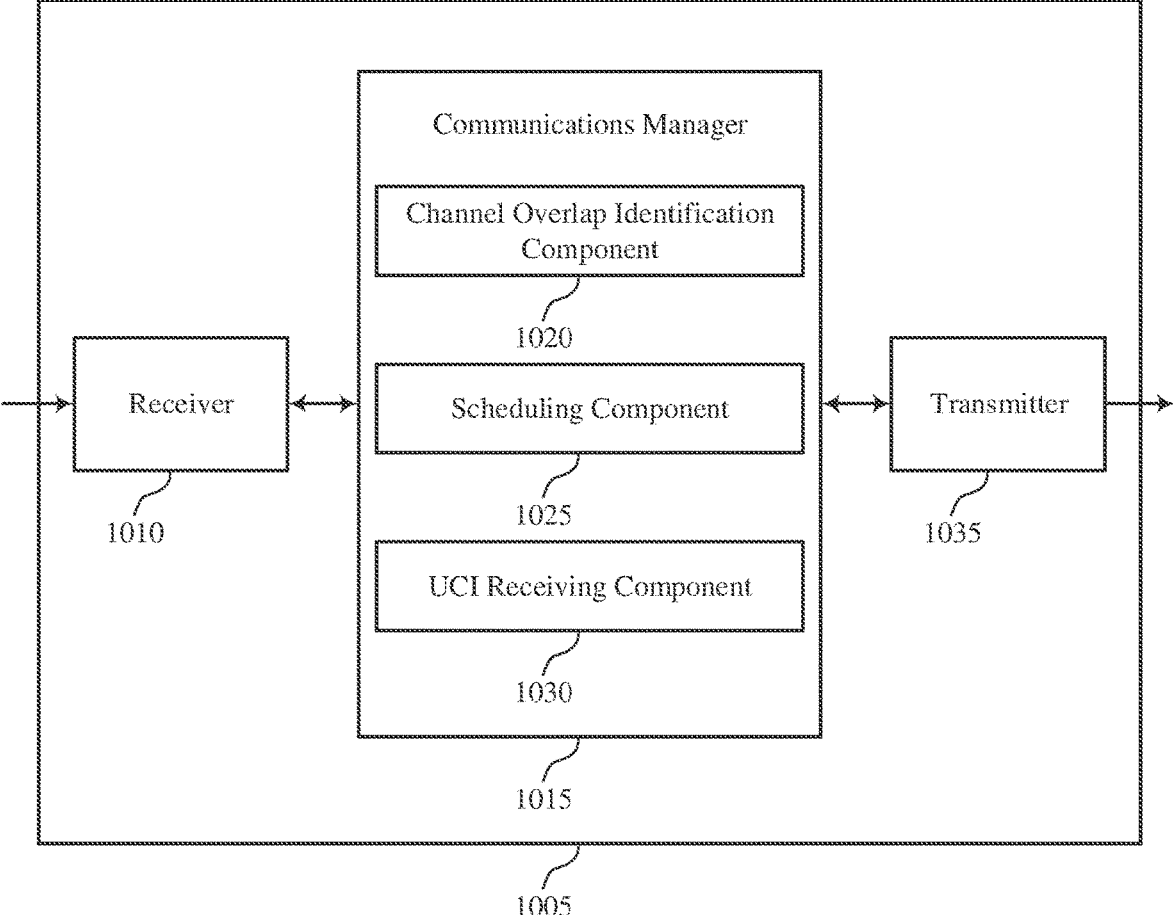

FIG. 10 shows a block diagram 1000 of a device 1005 that supports dynamic uplink control multiplexing between physical uplink channels in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to dynamic uplink control multiplexing between physical uplink channels, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a channel overlap identification component 1020, a scheduling component 1025, and an UCI receiving component 1030. The communications manager 1015 may be an example of aspects of the communications manager 1210 described herein.

The channel overlap identification component 1020 may identify a time domain overlap between an uplink shared channel and an uplink control channel.

The scheduling component 1025 may transmit, to a UE, scheduling information for the transmission of uplink control information, the scheduling information including an indication of the time domain overlap and a multiplexing configuration for the uplink control information.

The UCI receiving component 1030 may receive the uplink control information based on the multiplexing configuration.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
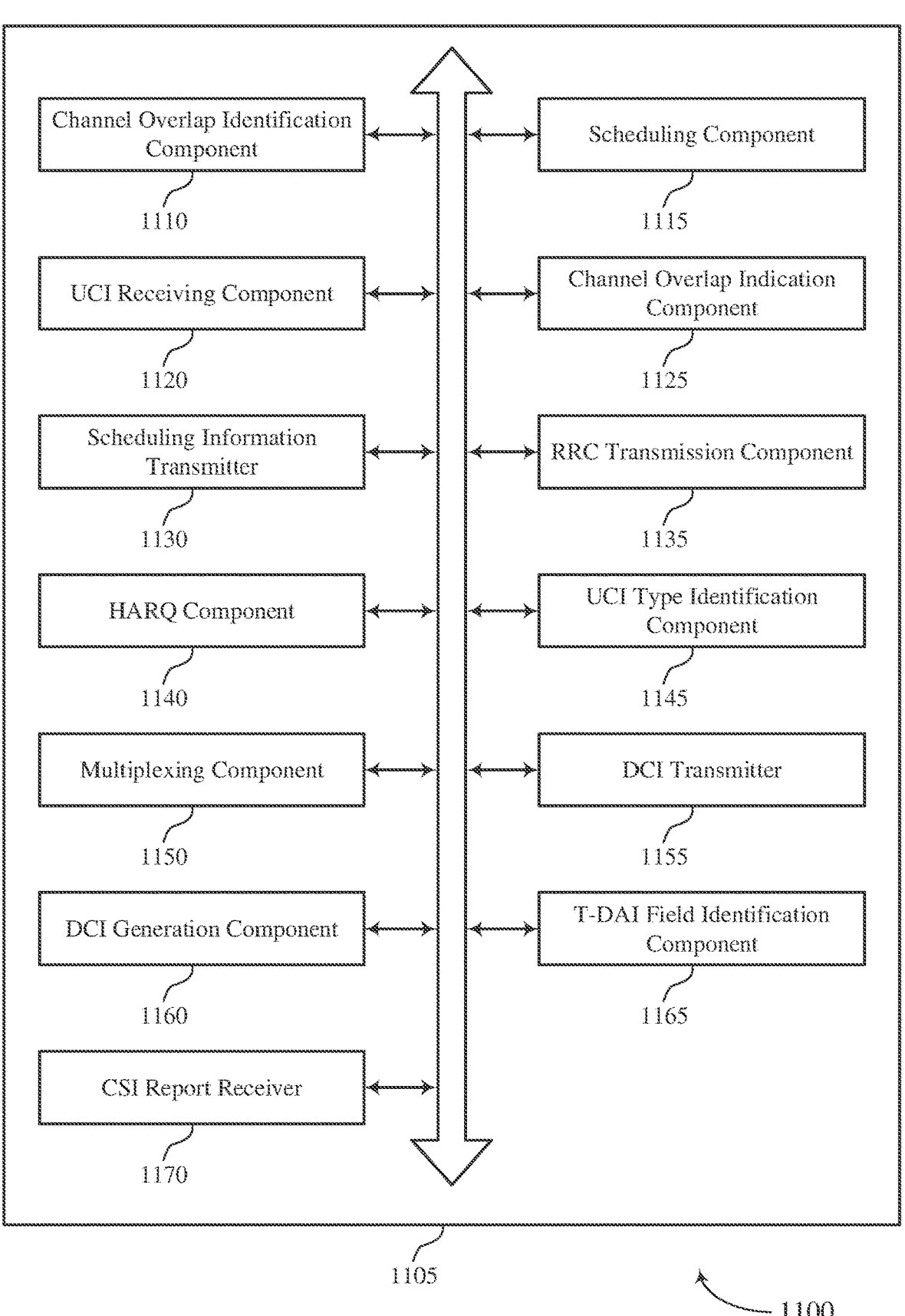
FIG. 11 shows a block diagram of a communications manager that supports dynamic uplink control multiplexing between physical uplink channels in accordance with aspects of the present disclosure.

FIG. 11 shows a block diagram 1100 of a communications manager 1105 that supports dynamic uplink control multiplexing between physical uplink channels in accordance with aspects of the present disclosure. The communications manager 1105 may be an example of aspects of a communications manager 915, a communications manager 1015, or a communications manager 1210 described herein. The communications manager 1105 may include a channel overlap identification component 1110, a scheduling component 1115, an UCI receiving component 1120, a channel overlap indication component 1125, a scheduling information transmitter 1130, a RRC transmission component 1135, a HARQ component 1140, an UCI type identification component 1145, a multiplexing component 1150, a DCI transmitter 1155, a DCI generation component 1160, a T-DAI field identification component 1165, and a CSI report receiver 1170. Each of these modules may communicate, directly or indirectly, with one another (e.g., via one or more buses).

The channel overlap identification component 1110 may identify a time domain overlap between an uplink shared channel and an uplink control channel. The channel overlap indication component 1125 may transmit an indication of a capability of the UE to support the uplink shared channel transmission on a first cell that at least partially overlaps in time with the uplink control channel transmission on a second cell. The scheduling information transmitter 1130 may transmit the scheduling information based on the capability.

The scheduling component 1115 may transmit, to a UE, scheduling information for the transmission of uplink control information, the scheduling information including an indication of the time domain overlap and a multiplexing configuration for the uplink control information. In some examples, the scheduling component 1115 may schedule an uplink shared channel resource or an uplink control channel resource for the transmission of the uplink control information based on the multiplexing configuration.

The UCI receiving component 1120 may receive the uplink control information based on the multiplexing configuration. In some examples, the UCI receiving component 1120 may receive the uplink control information on the uplink shared channel or on the uplink control channel based on the multiplexing configuration.

In some examples, the UCI receiving component 1120 may receive the uplink control information multiplexed on the uplink shared channel or on the uplink control channel based on the type of the uplink control information.

The UCI type identification component 1145 may determine a type of the uplink control information. In some examples, the UCI type identification component 1145 may identify the type of the uplink control information as one or more channel state information types. In some cases, the one or more channel state information types include periodic channel state information, aperiodic channel state information, semi-persistent channel state information, or a combination thereof.

In some examples, the UCI receiving component 1120 may receive the uplink control information and hybrid automatic repeat request information based on a value of the T-DAI field based on the multiplexing configuration.

The RRC transmission component 1135 may transmit a radio resource control configuration that indicates the multiplexing configuration for the uplink control information. In some examples, the RRC transmission component 1135 may transmit a radio resource control selection indicator in the radio resource control configuration. In some examples, the RRC transmission component 1135 may transmit the radio resource control configuration.

In some examples, the UCI receiving component 1120 may receive the uplink control information multiplexed on the uplink shared channel or the uplink control channel based on a value of the radio resource control selection indicator. In some examples, the UCI receiving component 1120 may receive the uplink control information on the uplink shared channel based on the multiplexing configuration being absent from the radio resource control configuration.

The HARQ component 1140 may receive, from the UE, hybrid automatic repeat request information based on the radio resource control configuration and the multiplexing configuration. In some examples, the HARQ component 1140 may determine a semi-static configuration or a dynamic configuration for generating the hybrid automatic repeat request information, where the semi-static configuration or the dynamic configuration are associated with a downlink shared channel codebook.

The DCI transmitter 1155 may transmit a downlink control information message to the UE, where a field of the downlink control information indicates the multiplexing configuration for the uplink control information. The DCI generation component 1160 may determine that the field of the downlink control information message includes a total downlink assignment index field. The T-DAI field identification component 1165 may indicate the value of the total downlink assignment index field indicates an uplink shared channel resource or an uplink control channel resource for transmission of the uplink control information.

In some cases, the field of the downlink control information message indicates an uplink shared channel resource or an uplink control channel resource for transmission of the uplink control information.

The CSI report receiver 1170 may determine that the uplink control channel transmission includes one or more channel state information reports for the uplink shared channel. In some examples, the CSI report receiver 1170 may receive the one or more channel state information reports on the uplink shared channel or the uplink control channel based on the multiplexing configuration. In some examples, the CSI report receiver 1170 may receive the one or more channel state information reports based on a radio resource control configuration that indicates whether uplink control information is to be multiplexed on the uplink shared channel or the uplink control channel. The multiplexing component 1150 may select the multiplexing configuration for the uplink control information based on the one or more channel state information types.

Figure 12:
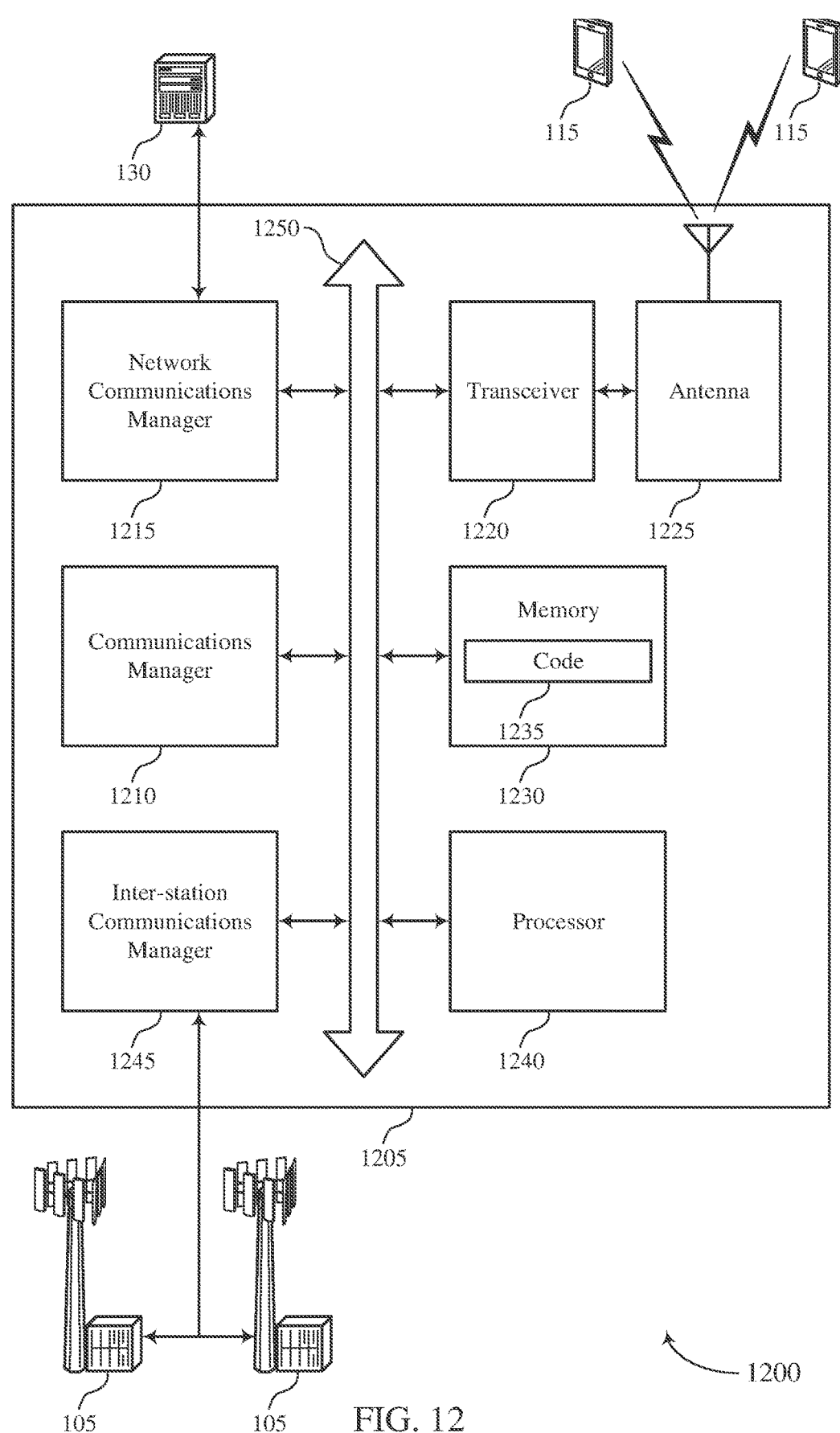
FIG. 12 shows a diagram of a system including a device that supports dynamic uplink control multiplexing between physical uplink channels in accordance with aspects of the present disclosure.

FIG. 12 shows a diagram of a system 1200 including a device 1205 that supports dynamic uplink control multiplexing between physical uplink channels in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may identify a time domain overlap between an uplink shared channel and an uplink control channel, transmit, to a UE, scheduling information for the transmission of uplink control information, the scheduling information including an indication of the time domain overlap and a multiplexing configuration for the uplink control information, and receive the uplink control information based on the multiplexing configuration.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting dynamic uplink control multiplexing between physical uplink channels).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

FIG. 13 shows a flowchart illustrating a method 1300 that supports dynamic uplink control multiplexing between physical uplink channels in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive scheduling information for the transmission of uplink control information, the scheduling information indicating a time domain overlap between an uplink shared channel and an uplink control channel. The operations of 1305 may be performed according to the methods described herein. In some examples, aspects of the operations of 1305 may be performed by a scheduling information component as described with reference to FIGS. 5 through 8.

At 1310, the UE may select a multiplexing configuration for the uplink control information based on the scheduling information. The operations of 1310 may be performed according to the methods described herein. In some examples, aspects of the operations of 1310 may be performed by a multiplexing component as described with reference to FIGS. 5 through 8.

At 1315, the UE may multiplex the uplink control information on the uplink shared channel or the uplink control channel based on the multiplexing configuration. The operations of 1315 may be performed according to the methods described herein. In some examples, aspects of the operations of 1315 may be performed by a multiplexing component as described with reference to FIGS. 5 through 8.

At 1320, the UE may transmit the uplink control information based on the multiplexing. The operations of 1320 may be performed according to the methods described herein. In some examples, aspects of the operations of 1320 may be performed by an UCI transmission component as described with reference to FIGS. 5 through 8.

FIG. 14 shows a flowchart illustrating a method 1400 that supports dynamic uplink control multiplexing between physical uplink channels in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive scheduling information for the transmission of uplink control information, the scheduling information indicating a time domain overlap between an uplink shared channel and an uplink control channel. The operations of 1405 may be performed according to the methods described herein. In some examples, aspects of the operations of 1405 may be performed by a scheduling information component as described with reference to FIGS. 5 through 8.

At 1410, the UE may select a multiplexing configuration for the uplink control information based on the scheduling information. The operations of 1410 may be performed according to the methods described herein. In some examples, aspects of the operations of 1410 may be performed by a multiplexing component as described with reference to FIGS. 5 through 8.

At 1415, the UE may determine an uplink shared channel resource or an uplink control channel resource for the transmission of the uplink control information based on the multiplexing configuration. The operations of 1415 may be performed according to the methods described herein. In some examples, aspects of the operations of 1415 may be performed by a resource selection component as described with reference to FIGS. 5 through 8.

At 1420, the UE may multiplex the uplink control information on the uplink shared channel or the uplink control channel based on the multiplexing configuration. The operations of 1420 may be performed according to the methods described herein. In some examples, aspects of the operations of 1420 may be performed by a multiplexing component as described with reference to FIGS. 5 through 8.

At 1425, the UE may transmit the uplink control information based on the multiplexing. The operations of 1425 may be performed according to the methods described herein. In some examples, aspects of the operations of 1425 may be performed by an UCI transmission component as described with reference to FIGS. 5 through 8.

FIG. 15 shows a flowchart illustrating a method 1500 that supports dynamic uplink control multiplexing between physical uplink channels in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive scheduling information for the transmission of uplink control information, the scheduling information indicating a time domain overlap between an uplink shared channel and an uplink control channel. The operations of 1505 may be performed according to the methods described herein. In some examples, aspects of the operations of 1505 may be performed by a scheduling information component as described with reference to FIGS. 5 through 8.

At 1510, the UE may receive a radio resource control configuration that indicates the multiplexing configuration for the uplink control information. The operations of 1510 may be performed according to the methods described herein. In some examples, aspects of the operations of 1510 may be performed by a RRC configuration component as described with reference to FIGS. 5 through 8.

At 1515, the UE may select a multiplexing configuration for the uplink control information based on the scheduling information. The operations of 1515 may be performed according to the methods described herein. In some examples, aspects of the operations of 1515 may be performed by a multiplexing component as described with reference to FIGS. 5 through 8.

At 1520, the UE may multiplex the uplink control information on the uplink shared channel or on the uplink control channel based on the radio resource control configuration. The operations of 1520 may be performed according to the methods described herein. In some examples, aspects of the operations of 1520 may be performed by a multiplexing component as described with reference to FIGS. 5 through 8.

At 1525, the UE may multiplex the uplink control information on the uplink shared channel or the uplink control channel based on the multiplexing configuration. The operations of 1525 may be performed according to the methods described herein. In some examples, aspects of the operations of 1525 may be performed by a multiplexing component as described with reference to FIGS. 5 through 8.

At 1530, the UE may transmit the uplink control information based on the multiplexing. The operations of 1530 may be performed according to the methods described herein. In some examples, aspects of the operations of 1530 may be performed by an UCI transmission component as described with reference to FIGS. 5 through 8.

Figure 16:
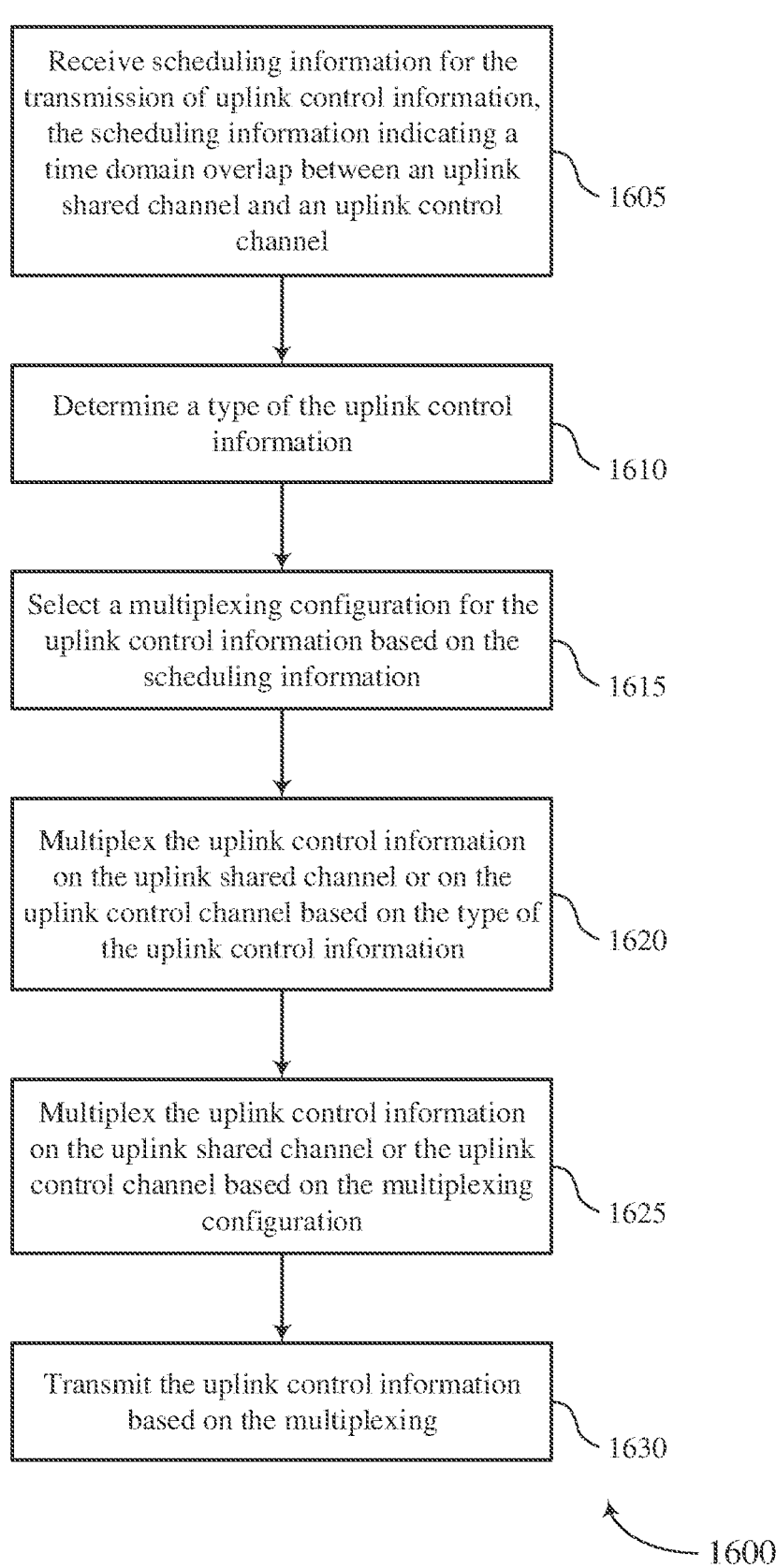

FIG. 16 shows a flowchart illustrating a method 1600 that supports dynamic uplink control multiplexing between physical uplink channels in accordance with aspects of the present disclosure. The operations of method 1600 may be implemented by a UE 115 or its components as described herein. For example, the operations of method 1600 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1605, the UE may receive scheduling information for the transmission of uplink control information, the scheduling information indicating a time domain overlap between an uplink shared channel and an uplink control channel. The operations of 1605 may be performed according to the methods described herein. In some examples, aspects of the operations of 1605 may be performed by a scheduling information component as described with reference to FIGS. 5 through 8.

At 1610, the UE may determine a type of the uplink control information. The operations of 1610 may be performed according to the methods described herein. In some examples, aspects of the operations of 1610 may be performed by an UCI type identification component as described with reference to FIGS. 5 through 8.

At 1615, the UE may select a multiplexing configuration for the uplink control information based on the scheduling information. The operations of 1615 may be performed according to the methods described herein. In some examples, aspects of the operations of 1615 may be performed by a multiplexing component as described with reference to FIGS. 5 through 8.

At 1620, the UE may multiplex the uplink control information on the uplink shared channel or on the uplink control channel based on the type of the uplink control information. The operations of 1620 may be performed according to the methods described herein. In some examples, aspects of the operations of 1620 may be performed by a multiplexing component as described with reference to FIGS. 5 through 8.

At 1625, the UE may multiplex the uplink control information on the uplink shared channel or the uplink control channel based on the multiplexing configuration. The operations of 1625 may be performed according to the methods described herein. In some examples, aspects of the operations of 1625 may be performed by a multiplexing component as described with reference to FIGS. 5 through 8.

At 1630, the UE may transmit the uplink control information based on the multiplexing. The operations of 1630 may be performed according to the methods described herein. In some examples, aspects of the operations of 1630 may be performed by an UCI transmission component as described with reference to FIGS. 5 through 8.

Figure 17:
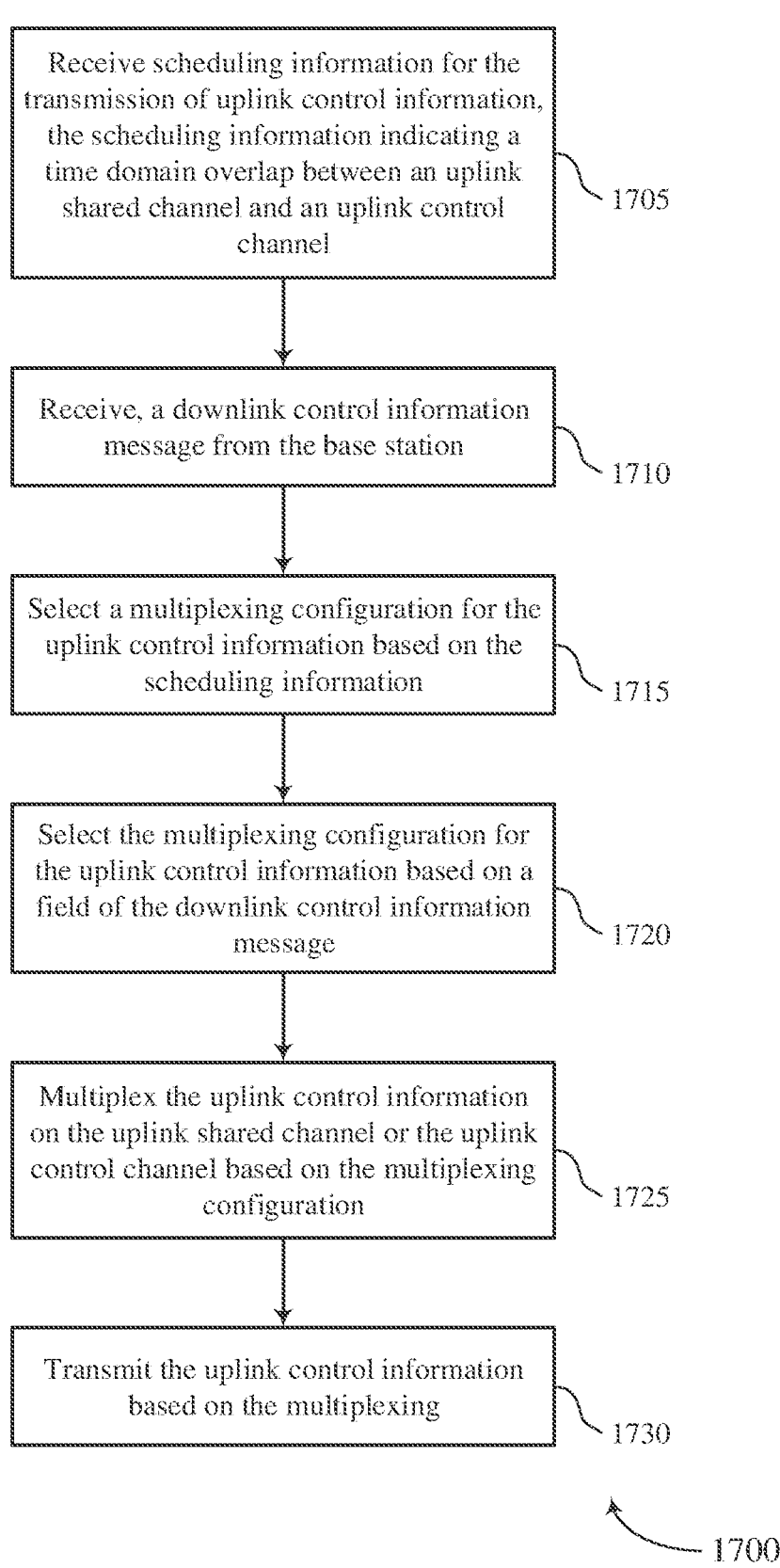

FIG. 17 shows a flowchart illustrating a method 1700 that supports dynamic uplink control multiplexing between physical uplink channels in accordance with aspects of the present disclosure. The operations of method 1700 may be implemented by a UE 115 or its components as described herein. For example, the operations of method 1700 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1705, the UE may receive scheduling information for the transmission of uplink control information, the scheduling information indicating a time domain overlap between an uplink shared channel and an uplink control channel. The operations of 1705 may be performed according to the methods described herein. In some examples, aspects of the operations of 1705 may be performed by a scheduling information component as described with reference to FIGS. 5 through 8.

At 1710, the UE may receive, a downlink control information message from the base station. The operations of 1710 may be performed according to the methods described herein. In some examples, aspects of the operations of 1710 may be performed by a DCI receiver as described with reference to FIGS. 5 through 8.

At 1715, the UE may select a multiplexing configuration for the uplink control information based on the scheduling information. The operations of 1715 may be performed according to the methods described herein. In some examples, aspects of the operations of 1715 may be performed by a multiplexing component as described with reference to FIGS. 5 through 8.

At 1720, the UE may select the multiplexing configuration for the uplink control information based on a field of the downlink control information message. The operations of 1720 may be performed according to the methods described herein. In some examples, aspects of the operations of 1720 may be performed by a multiplexing component as described with reference to FIGS. 5 through 8.

At 1725, the UE may multiplex the uplink control information on the uplink shared channel or the uplink control channel based on the multiplexing configuration. The operations of 1725 may be performed according to the methods described herein. In some examples, aspects of the operations of 1725 may be performed by a multiplexing component as described with reference to FIGS. 5 through 8.

At 1730, the UE may transmit the uplink control information based on the multiplexing. The operations of 1730 may be performed according to the methods described herein. In some examples, aspects of the operations of 1730 may be performed by an UCI transmission component as described with reference to FIGS. 5 through 8.

FIG. 18 shows a flowchart illustrating a method 1800 that supports dynamic uplink control multiplexing between physical uplink channels in accordance with aspects of the present disclosure. The operations of method 1800 may be implemented by a base station 105 or its components as described herein. For example, the operations of method 1800 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1805, the base station may identify a time domain overlap between an uplink shared channel and an uplink control channel. The operations of 1805 may be performed according to the methods described herein. In some examples, aspects of the operations of 1805 may be performed by a channel overlap identification component as described with reference to FIGS. 9 through 12.

At 1810, the base station may transmit, to a UE, scheduling information for the transmission of uplink control information, the scheduling information including an indication of the time domain overlap and a multiplexing configuration for the uplink control information. The operations of 1810 may be performed according to the methods described herein. In some examples, aspects of the operations of 1810 may be performed by a scheduling component as described with reference to FIGS. 9 through 12.

At 1815, the base station may receive the uplink control information based on the multiplexing configuration. The operations of 1815 may be performed according to the methods described herein. In some examples, aspects of the operations of 1815 may be performed by an UCI receiving component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:

receiving scheduling information for a transmission of uplink control information of a second cell, the scheduling information corresponding to a time domain overlap between an uplink shared channel of a first cell and an uplink control channel of a second cell, the second cell being different from the first cell;

selecting a multiplexing configuration for the uplink control information based at least in part on the scheduling information;

determining, based at least in part on the multiplexing configuration, whether to multiplex the uplink control information of the second cell with data of the first cell on the uplink shared channel of the first cell; and transmitting, in accordance with the determining, the uplink control information of the second cell on the uplink control channel of the second cell or multiplexed with the data of the first cell on the uplink shared channel of the first cell.

2. The method of claim 1, further comprising:
determining an uplink shared channel resource of the first cell for the transmission of the multiplexed uplink control information of the second cell and the data of the first cell or an uplink control channel resource for transmission of the uplink control information of the second cell based at least in part on the multiplexing configuration.

3. The method of claim 1 further comprising:
receiving an indication of a capability of the UE to support an uplink shared channel transmission via the first cell that at least partially overlaps in time with an uplink control channel transmission via the second cell; and
selecting the multiplexing configuration based at least in part on the capability.

4. The method of claim 1, further comprising:
receiving a radio resource control configuration that indicates the multiplexing configuration for the uplink control information, wherein determining whether to multiplex the uplink control information of the second cell with the data of the first cell on the uplink shared channel is based at least in part on the radio resource control configuration.

5. The method of claim 4, further comprising:
identifying a radio resource control selection indicator in the radio resource control configuration, wherein determining whether to multiplex the uplink control information of the second cell with the data of the first cell is based at least in part on a value of the radio resource control selection indicator.

6. The method of claim 4, further comprising:
determining that the multiplexing configuration is absent from the radio resource control configuration, wherein determining whether to multiplex the uplink control information of the second cell with the data of the first cell on the uplink shared channel of the first cell is based at least in part on determining that the multiplexing configuration is absent from the radio resource control configuration.

7. The method of claim 4, further comprising:
determining that the radio resource control configuration indicates the uplink shared channel for transmitting the multiplexed uplink control information of the second cell and the data of the first cell or the uplink control channel of the second cell for transmitting the uplink control information of the second cell; and
generating hybrid automatic repeat request information based at least in part on the radio resource control configuration.

8. The method of claim 1, further comprising:
determining a type of the uplink control information, wherein determining whether to multiplex the uplink control information of the second cell with the data of the first cell on the uplink shared channel is based at least in part on the type of the uplink control information.

9. The method of claim 8, further comprising:
identifying the type of the uplink control information as one or more channel state information types, wherein selecting the multiplexing configuration for the uplink control information is based at least in part on the one or more channel state information types.

10. The method of claim 9, wherein the one or more channel state information types comprise periodic channel state information, aperiodic channel state information, semi-persistent channel state information, or a combination thereof.

11. The method of claim 1, further comprising:
receiving a downlink control information message from a network device, wherein selecting the multiplexing configuration for the uplink control information is based at least in part on a field of the downlink control information message.

12. The method of claim 11, wherein the field of the downlink control information message indicates an uplink shared channel resource for transmission of the multiplexed uplink control information of the second cell and the data of the first cell or an uplink control channel resource for transmission of the uplink control information of the second cell.

13. The method of claim 11, further comprising:
determining that the field of the downlink control information message comprises a total downlink assignment index field, wherein selecting the multiplexing configuration for the uplink control information based at least in part on a value of the total downlink assignment index field; and
generating hybrid automatic repeat request information based at least in part on the multiplexing configuration.

14. The method of claim 13, wherein the value of the total downlink assignment index field indicates an uplink shared channel resource or an uplink control channel resource for transmission of the uplink control information.

15. The method of claim 13, wherein generating the hybrid automatic repeat request information further comprises:
determining a semi-static configuration or a dynamic configuration for generating the hybrid automatic repeat request information, wherein the semi-static configuration or the dynamic configuration are associated with a downlink shared channel codebook.

16. The method of claim 1, further comprising:
determining that the uplink control information comprises one or more channel state information reports for the uplink shared channel; and
selecting the uplink shared channel or the uplink control channel for transmission of the one or more channel state information reports based at least in part on the multiplexing configuration.

17. The method of claim 16, further comprising:
determining that the multiplexing configuration comprises a radio resource control configuration that indicates whether the uplink control information is to be multiplexed with the data on the uplink shared channel; and
selecting the uplink shared channel of the first cell or the uplink control channel of the second cell for transmission of the one or more channel state information reports.

18. A method for wireless communications at a network device, comprising:
transmitting, to a user equipment (UE), scheduling information for a transmission of uplink control information of a second cell, the scheduling information corresponding to a time domain overlap between an uplink shared channel of a first cell and an uplink control channel of the second cell, the second cell being different from the first cell, and an indication of a multiplexing configuration for the uplink control information of the second cell, the multiplexing configuration indicating whether to multiplex the uplink control information of the second cell with data of the first cell on the uplink shared channel of the first cell; and receiving the uplink control information of the second cell on the uplink control channel of the second cell or multiplexed with data of the first cell on the uplink shared channel of the first cell based at least in part on the multiplexing configuration.

19. The method of claim 18, further comprising:

scheduling an uplink shared channel resource or an uplink control channel resource for the transmission of the uplink control information based at least in part on the multiplexing configuration.

20. The method of claim 18 further comprising:

transmitting an indication of a capability of the UE to support an uplink shared channel transmission via the first cell that at least partially overlaps in time with an uplink control channel transmission via the second cell, wherein transmitting the scheduling information is based at least in part on the capability.

21. The method of claim 18, further comprising:

transmitting a radio resource control configuration that indicates the multiplexing configuration for the uplink control information, wherein receiving the uplink control information of the second cell on the uplink control channel of the second cell or multiplexed with the data of the first cell on the uplink shared channel of the first cell is based at least in part on the multiplexing configuration.

22. The method of claim 21, further comprising:

transmitting a radio resource control selection indicator in the radio resource control configuration, wherein receiving the uplink control information of the second cell on the uplink control channel of the second cell or multiplexed with the data of the first cell on the uplink shared channel of the first cell is based at least in part on a value of the radio resource control selection indicator.

23. The method of claim 21, further comprising:

transmitting the radio resource control configuration, wherein receiving the uplink control information of the second cell on the uplink control channel of the second cell or multiplexed with the data of the first cell on the uplink shared channel of the first cell is based at least in part on the multiplexing configuration being absent from the radio resource control configuration.

24. The method of claim 21, further comprising:

receiving, from the UE, hybrid automatic repeat request information based at least in part on the radio resource control configuration and the multiplexing configuration.

25. The method of claim 18, further comprising:

transmitting a downlink control information message to the UE, wherein a field of the downlink control information message indicates the multiplexing configuration for the uplink control information.

26. The method of claim 25, further comprising:

determining that the field of the downlink control information message comprises a total downlink assignment index field; and receiving the uplink control information and hybrid automatic repeat request information based at least in part on a value of the total downlink assignment index field based at least in part on the multiplexing configuration.

27. The method of claim 18, further comprising:

determining that the uplink control information comprises one or more channel state information reports for the uplink shared channel; and receiving the one or more channel state information reports on the uplink shared channel or the uplink control channel based at least in part on the multiplexing configuration.

28. The method of claim 27, further comprising:

receiving the one or more channel state information reports based at least in part on a radio resource control configuration that indicates whether the uplink control information of the second cell is to be multiplexed with the data on the uplink shared channel of the first cell.

29. A user equipment (UE) for wireless communications, comprising:

at least one processor, memory coupled with the at least one processor; and instructions stored in the memory and executable by the at least one processor to cause the UE to:

receive scheduling information for a transmission of uplink control information of a second cell, the scheduling information corresponding to a time domain overlap between an uplink shared channel of a first cell and an uplink control channel of the second cell, the second cell being different from the first cell;

select a multiplexing configuration for the uplink control information based at least in part on the scheduling information;

determine, based at least in part on the multiplexing configuration, whether to multiplex the uplink control information of the second cell with data of the first cell on the uplink shared channel of the first cell; and transmit, in accordance with the determination, the uplink control information of the second cell on the uplink control channel of the second cell or multiplexed with the data of the first cell on the uplink shared channel of the first cell.

30. A network entity for wireless communications, comprising:

at least one processor, memory coupled with the at least one processor; and instructions stored in the memory and executable by the at least one processor to cause the network entity to:

transmit, to a user equipment (UE), scheduling information for a transmission of uplink control information of a second cell, the scheduling information corresponding to a time domain overlap between an uplink shared channel of a first cell and an uplink control channel of the second cell, the second cell being different from the first cell and an indication of a multiplexing configuration for the uplink control information of the second cell, the multiplexing configuration indicating whether to multiplex the uplink control information of the second cell with data of the first cell on the uplink shared channel of the first cell; and receive the uplink control information of the second cell on the uplink control channel of the second cell or multiplexed with data of the first cell on the uplink shared channel of the first cell based at least in part on the multiplexing configuration.

* * * * *